US011956794B2

(12) United States Patent
Hang et al.

(10) Patent No.: US 11,956,794 B2
(45) Date of Patent: Apr. 9, 2024

(54) DATA SENDING AND RECEIVING METHOD AND COMMUNICATION APPARATUS

(71) Applicant: Huawei Technologies Co., Ltd., Shenzhen (CN)

(72) Inventors: Haicun Hang, Shanghai (CN); Shibin Ge, Shanghai (CN); Xiaohan Wang, Shanghai (CN); Liuliu Ji, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 440 days.

(21) Appl. No.: 17/246,236

(22) Filed: Apr. 30, 2021

(65) Prior Publication Data

US 2021/0259003 A1 Aug. 19, 2021

Related U.S. Application Data

(63) Continuation of application No. PCT/CN2019/114492, filed on Oct. 30, 2019.

(30) Foreign Application Priority Data

Nov. 2, 2018 (CN) ......................... 201811303221.0

(51) Int. Cl.
*H04W 72/14* (2009.01)
*H04W 72/1273* (2023.01)
*H04W 72/23* (2023.01)

(52) U.S. Cl.
CPC ....... *H04W 72/23* (2023.01); *H04W 72/1273* (2013.01)

(58) Field of Classification Search
CPC ............... H04L 5/0044; H04L 5/0053; H04W 72/1273; H04W 72/23
See application file for complete search history.

(56) References Cited

U.S. PATENT DOCUMENTS

2018/0310333 A1* 10/2018 Akkarakaran ........ H04W 72/20
2022/0095354 A1* 3/2022 Kim ...................... H04W 24/10
2022/0174524 A1* 6/2022 Hang .................... H04L 5/0094

FOREIGN PATENT DOCUMENTS

CN 107846373 A 3/2018
CN 108024310 A 5/2018
(Continued)

OTHER PUBLICATIONS

"3rd Generation Partnership Project; Technical Specification Group Radio Access Network; NR; Physical channels and modulation (Release 15)," 3GPP TS 38.211 V15.3.0, pp. 1-96, 3rd Generation Partnership Project, Valbonne, France (Sep. 2018).

(Continued)

*Primary Examiner* — Phuc H Tran
(74) *Attorney, Agent, or Firm* — Leydig, Voit & Mayer, Ltd.

(57) ABSTRACT

This application provides a data sending and receiving method. The method includes: receiving, by a terminal device, a first PDCCH and a second PDCCH, where the first PDCCH is used to schedule a first PDSCH, and the first PDSCH is used to transmit first data; determining, based on the first PDCCH and the second PDCCH, a first resource used to transmit the first data, where the first resource is a part or all of a resource of the first PDSCH; and receiving, by the terminal device, the first data from a network device on the first resource. The first resource is determined with reference to the first PDCCH and the second PDCCH, to avoid a problem that receiving performance of the first PDSCH and the second PDCCH may deteriorate when a resource of the second PDCCH overlaps the resource of the first PDSCH.

16 Claims, 3 Drawing Sheets

200

Terminal device | First network device | Second network device

210: First PDCCH

220: Second PDCCH

230: Determine a first resource used to transmit first data

240: Determine the first resource used to transmit the first data

250: First data transmitted by using the first resource

260: Second data transmitted on a second PDSCH

(56) References Cited

FOREIGN PATENT DOCUMENTS

| | | | |
|---|---|---|---|
| CN | 108633002 | A | 10/2018 |
| IN | 108282289 | A | 7/2018 |
| WO | 2011126329 | A3 | 10/2011 |
| WO | 2018028800 | A1 | 2/2018 |
| WO | 2018093162 | A1 | 5/2018 |
| WO | 2018200748 | A1 | 11/2018 |

OTHER PUBLICATIONS

"3rd Generation Partnership Project; Technical Specification Group Radio Access Network; NR; Physical layer procedures for data (Release 15)," 3GPP TS 38.214 V15.3.0, pp. 1-96, 3rd Generation Partnership Project, Valbonne, France (Sep. 2018).

Huawei, HiSilicon, "Discussion on Multi-TRP cooperation for URLLC," 3GPP TSG RAN WG1 Meeting #92, Athens, Greece, R1-1802716, XP051398149, total 5 pages, 3rd Generation Partnership Project, Valbonne, France (Feb. 26-Mar. 2, 2018).

* cited by examiner

DATA SENDING AND RECEIVING METHOD AND COMMUNICATION APPARATUS

CROSS-REFERENCE TO RELATED APPLICATIONS

This application is a continuation of International Application No. PCT/CN2019/114492, filed on Oct. 30, 2019, which claims priority to Chinese Patent Application No. 201811303221.0, filed on Nov. 2, 2018. The disclosures of the aforementioned applications are hereby incorporated by reference in their entireties.

TECHNICAL FIELD

This application relates to the field of wireless communication, and more specifically, to a data sending and receiving method and a communication apparatus.

BACKGROUND

In downlink transmission, a network device such as a transmission reception point (TRP) may schedule a physical downlink shared channel (PDSCH) for a terminal device by transmitting downlink control information (DCI) on a physical downlink control channel (PDCCH). The terminal device may receive downlink data on the PDSCH scheduled by the network device for the terminal device.

However, in some cases, the network device may urgently schedule, based on some urgent services such as an ultra-reliable low-latency communication (URLLC) service, a PDSCH for the terminal device by using a PDCCH. Both the PDCCH and the PDSCH may separately conflict with a previously scheduled PDSCH resource. Consequently, data receiving performance of the terminal device deteriorates.

SUMMARY

This application provides a data sending and receiving method and a communication apparatus, to improve data transmission performance.

According to a first aspect, a data receiving method is provided. The method may be performed by a terminal device, or may be performed by a chip disposed in a terminal device. This is not limited in this application.

Specifically, the method includes: receiving a first PDCCH, where the first PDCCH is used to schedule a first physical downlink shared channel PDSCH, and the first PDSCH is used to transmit first data; receiving a second PDCCH; determining, based on the first PDCCH and the second PDCCH, a first resource used to transmit the first data, where the first resource is a part or all of a resource of the first PDSCH; and receiving the first data on the first resource.

Therefore, when receiving the first PDCCH and the second PDCCH, the terminal device may determine, with reference to the first PDCCH and the second PDCCH, the first resource used to transmit the first data. Because both the resource scheduled by using the first PDCCH and a resource scheduled by using the second PDCCH are considered, the resource for transmitting the first data may be properly determined, to avoid a possible resource conflict, thereby helping improve data transmission performance.

According to a second aspect, this application provides a data sending method. The method may be performed by a network device, or may be performed by a chip disposed in a network device. This is not limited in this application.

Specifically, the method includes: sending a first physical downlink control channel PDCCH, where the first PDCCH is used to indicate to schedule a first physical downlink shared channel PDSCH, and the first PDSCH is used to transmit first data; sending a second PDCCH; determining, based on the first PDCCH and the second PDCCH, a first resource used to transmit the first data, where the first resource is a part or all of a resource of the first PDSCH; and sending the first data on the first resource.

Therefore, when sending the first PDCCH and the second PDCCH, the network device may determine, with reference to the first PDCCH and the second PDCCH, the first resource used to transmit the first data. Because both the resource scheduled by using the first PDCCH and a resource scheduled by using the second PDCCH are considered, the resource for transmitting the first data may be properly determined, to avoid a possible resource conflict, and avoid interference that may be caused when different data is sent by using a same time-frequency resource, thereby helping improve data transmission performance.

With reference to the first aspect or the second aspect, in some possible implementations, when a resource of the second PDCCH overlaps the resource of the first PDSCH, the determining, based on the first PDCCH and the second PDCCH, a first resource used to transmit the first data includes: determining, as the first resource, a resource other than the second PDCCH in the first PDSCH scheduled by using the first PDCCH.

When the resource of the second PDCCH overlaps the resource of the first PDSCH, both the terminal device and the network device may remove an overlapping resource from the first PDSCH, and determine, as the first resource, a remaining resource that is in the first PDSCH and that is obtained by removing the resource occupied by the second PDCCH. Therefore, interference of data transmission on the first PDSCH to the second PDCCH can be avoided, and correct receiving and decoding of the second PDCCH can be ensured, to avoid loss of important signaling and data.

With reference to the first aspect or the second aspect, in some possible implementations, the second PDCCH is used to schedule a second PDSCH; and when a resource of the second PDSCH overlaps the resource of the first PDSCH, the determining, based on the first PDCCH and the second PDCCH, a first resource used to transmit the first data includes: determining, as the first resource, a resource other than the second PDSCH in the first PDSCH.

When the resource of the second PDSCH overlaps the resource of the first PDSCH, both the terminal device and the network device may remove an overlapping resource from the first PDSCH, and determine, as the first resource, a remaining resource that is in the first PDSCH and that is obtained by removing the resource occupied by the second PDSCH. Therefore, mutual interference between the first PDSCH and the second PDSCH can be avoided, and data transmission performance can be improved.

In addition, when the first PDSCH and the second PDSCH are from a same network device or a same network device group, second data transmitted on the second PDSCH may be usually data of an urgent service, for example, data of a URLLC service. In this embodiment, the resource that is in the first PDSCH and that is in an overlapping area between the first PDSCH and the second PDSCH is discarded, and the second data is transmitted by using the second PDSCH, so that reliable transmission of the urgent service can be preferentially ensured.

With reference to the first aspect or the second aspect, in some possible implementations, the second PDCCH is used to schedule a second PDSCH; and when both a resource of the second PDCCH and a resource of the second PDSCH overlap the resource of the first PDSCH, the determining, based on the first PDSCH and the second PDCCH, a first resource used to transmit the first data includes: determining, as the first resource, a resource other than the second PDCCH and the second PDSCH in the first PDSCH scheduled by using the first PDCCH.

When both the resource of the second PDCCH and a resource of the second PDSCH overlap the resource of the first PDSCH, both the terminal device and the network device may remove overlapping resources from the first PDSCH, and determine, as the first resource, a remaining resource that is in the first PDSCH and that is obtained by removing the resources occupied by the second PDCCH and the second PDSCH. Therefore, mutual interference between the first PDSCH and the second PDCCH and between the first PDSCH and the second PDSCH can be avoided, and data transmission performance can be improved.

In addition, when the first PDSCH or the second PDSCH is from a same network device or a same network device group, the second PDCCH may be usually used to schedule a physical downlink resource for an urgent service such as a URLLC service. Second data transmitted on the second PDSCH may be usually data of the urgent service, for example, data of the URLLC service. In this embodiment, the resources that are in the first PDSCH and that are in an overlapping area between the first PDSCH and the second PDCCH and an overlapping area between the first PDSCH and the second PDSCH are discarded, to ensure correct receiving of the second PDCCH, and avoid loss of the data of the urgent service. The second data may be transmitted by using the second PDSCH, thereby ensuring reliable transmission of the urgent service.

With reference to the first aspect or the second aspect, in some possible implementations, the second PDCCH is used to schedule a second PDSCH; and when neither a resource of the second PDCCH nor a resource of the second PDSCH overlaps the resource of the first PDSCH, the determining, based on the first PDSCH and the second PDCCH, a first resource used to transmit the first data includes: determining, as the first resource, the first PDSCH scheduled by using the first PDCCH.

When neither the resource of the second PDCCH nor the resource of the second PDSCH overlaps the resource of the first PDSCH, the terminal device and the network device may still perform transmission according to a method in a conventional technology. The terminal device may separately receive different data on the first PDSCH and the second PDSCH.

With reference to the first aspect, in some possible implementations, the determining, based on the first PDCCH and the second PDCCH, a first resource used to transmit the first data includes: when the first PDCCH and the second PDCCH meet a preset condition, determining, based on the first PDSCH and the second PDCCH, the first resource used to transmit the first data.

When a first network device and a second network device are a same network device or belong to a same network device group, the first PDCCH and the second PDCCH may be used for scheduling based on different service types respectively. For example, the first PDSCH scheduled by using the first PDCCH may be used to transmit data of a non-urgent service, and the second PDSCH scheduled by using the second PDCCH may be used to transmit the data of the urgent service. Therefore, the network device and the terminal device may determine the first resource based on the first PDCCH and the second PDCCH respectively, to avoid incorrect receiving or loss, of the data of the urgent service, caused by that the first resource overlaps the resource of the second PDCCH and/or the resource of the second PDSCH, thereby ensuring transmission reliability of the urgent service.

With reference to the first aspect, in some possible implementations, the determining, based on the first PDCCH and the second PDCCH, a first resource used to transmit the first data includes: when the first PDCCH and the second PDCCH do not meet a preset condition, determining, based on the first PDCCH, the first resource used to transmit the first data.

When a first network device and a second network device are different network devices or belong to different network device groups, the first PDCCH and the second PDCCH may be used for scheduling based on a same service type or different service types. Because different data may be transmitted between two network devices in a spatial multiplexing transmission mode, the terminal device may receive data from different network devices based on a method in a conventional technology. The first PDSCH and the second PDCCH may overlap, or may not overlap. The first PDSCH and a second PDSCH may overlap, or may not overlap. This is not limited in this application. In the spatial multiplexing transmission mode, the different data can be transmitted on a same time-frequency resource, thereby improving spectrum resource utilization, and helping improve system performance.

With reference to the first aspect, in some possible implementations, the preset condition includes one or more of the following:

a PDCCH configuration of the first PDCCH is the same as a PDCCH configuration of the second PDCCH;

a control resource set of the first PDCCH and a control resource set of the second PDCCH belong to a same control resource set;

the control resource set of the first PDCCH and the control resource set of the second PDCCH belong to a same control resource set group;

a search space set of the first PDCCH and a search space set of the second PDCCH belong to a same search space set;

the search space set of the first PDCCH and the search space set of the second PDCCH belong to a same search space set group;

a demodulation reference signal (Demodulation Reference Signal, DMRS) port indicated on the first PDCCH and a DMRS port indicated on the second PDCCH belong to a same DMRS port group (DMRS port group);

the first PDCCH and the second PDCCH are from a same cell;

the first PDCCH and the second PDCCH are from a same cell group;

both the first PDCCH and the second PDCCH are primary PDCCHs;

a receive beam of the first PDSCH scheduled by using the first PDCCH and a receive beam of the second PDSCH scheduled by using the second PDCCH belong to a same receive beam group;

a receive beam of the first PDCCH and a receive beam of the second PDCCH belong to a same receive beam group; and a PDSCH configuration of the first PDSCH scheduled by using the first PDCCH is the same as a PDSCH configuration of the second PDSCH scheduled by using the second PDCCH.

It should be understood that the foregoing listed preset conditions are merely examples, and should not constitute any limitation on this application. When one or more conditions are defined as the preset condition in a protocol, the terminal device and the network device may determine, based on a same preset condition, whether the first resource needs to be re-determined based on the first PDCCH and the second PDCCH.

With reference to the first aspect or the second aspect, in some possible implementations, the first PDCCH is located before the second PDCCH in time domain.

That is, the terminal device may determine the first PDCCH and the second PDCCH based on a time sequence of the received PDCCHs. The terminal device may determine a PDCCH that is received first as the first PDCCH, and may determine a PDCCH that is received later as the second PDCCH.

With reference to the first aspect or the second aspect, in some possible implementations, a mapping type of a time domain resource location of the first PDSCH is a type A; and a mapping type of a time domain resource location of the second PDSCH scheduled by using the second PDCCH is a type B.

That is, the terminal device may determine the first PDCCH and the second PDCCH based on mapping types, indicated on the PDCCHs, of time-domain resources locations of PDSCHs. The terminal device may determine, as the first PDCCH, a PDCCH corresponding to a PDSCH whose mapping type of a time domain resource location is the type A, and may determine, as the second PDCCH, a PDCCH corresponding to a PDSCH whose mapping type of a time domain resource location is the type B.

For specific content of the type A and the type B, refer to the conventional technology. For example, refer to related descriptions in the NR protocols TS38.211 and TS38.214. For brevity, detailed descriptions of the type A and the type B are omitted in this specification.

With reference to the first aspect or the second aspect, in some possible implementations, a start symbol of a downlink DMRS of the first PDSCH is a second symbol or a third symbol in a slot in which the first PDSCH is located; and a start symbol of a downlink DMRS of the second PDSCH scheduled by using the second PDCCH is an initial symbol of the second PDSCH.

That is, the terminal device may determine the first PDCCH and the second PDCCH based on start symbols of DMRSs in time domain. The terminal device may determine, as the first PDCCH, a PDCCH corresponding to a PDSCH whose start symbol of a DMRS is located on a second symbol or a third symbol in a slot in which the PDSCH is located, and may determine, as the second PDCCH, a PDCCH corresponding to a PDSCH whose start symbol of a DMRS is located on an initial symbol of the PDSCH.

Based on the foregoing listed methods, the terminal device may determine which PDCCH is the first PDCCH and which PDCCH is the second PDCCH, and may determine, based on the first PDCCH and the second PDCCH, the first resource used to transmit the first data.

With reference to the first aspect, in some possible implementations, the method further includes: determining a second PDSCH based on the second PDCCH; and receiving second data on the second PDSCH.

The terminal device and the network device may transmit the second data based on the second PDSCH scheduled by using the second PDCCH. The second data may be data of an urgent service. In other words, in this application, normal transmission of the data of the urgent service can be preferentially ensured, to ensure reliability and a low latency of transmission of the urgent service.

According to a third aspect, a communication apparatus is provided, and includes modules or units configured to perform the method according to any possible implementation of the first aspect.

According to a fourth aspect, a communication apparatus is provided, and includes a processor. The processor is coupled to a memory, and may be configured to execute instructions in the memory, to implement the method according to any possible implementation of the first aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip disposed in a terminal device. When the communication apparatus is the chip disposed in the terminal device, the communication interface may be an input/output interface.

Optionally, the transceiver may be a transceiver circuit. Optionally, the input/output interface may be an input/output circuit.

According to a fifth aspect, a communication apparatus is provided, and includes modules or units configured to perform the method in any possible implementation of the second aspect.

According to a sixth aspect, a communication apparatus is provided, and includes a processor. The processor is coupled to a memory, and may be configured to execute instructions in the memory, to implement the method according to any possible implementation of the second aspect. Optionally, the communication apparatus further includes the memory. Optionally, the communication apparatus further includes a communication interface, and the processor is coupled to the communication interface.

In an implementation, the communication apparatus is a network device. When the communication apparatus is the network device, the communication interface may be a transceiver or an input/output interface.

In another implementation, the communication apparatus is a chip disposed in a network device. When the communication apparatus is the chip disposed in the network device, the communication interface may be an input/output interface.

Optionally, the transceiver may be a transceiver circuit. Optionally, the input/output interface may be an input/output circuit.

According to a seventh aspect, a processor is provided, and includes an input circuit, an output circuit, and a processing circuit. The processing circuit is configured to receive a signal by using the input circuit, and transmit a signal by using the output circuit, so that the processor performs the method according to any one of the first aspect, the second aspect, or the possible implementations of the first aspect or the second aspect.

In a specific implementation process, the processor may be a chip, the input circuit may be an input pin, the output circuit may be an output pin, and the processing circuit may be a transistor, a gate circuit, a trigger, various logic circuits, or the like. The input signal received by using the input circuit may be received and input by using, for example, but not limited to, a receiver, the signal output by using the output circuit may be output to, for example, but not limited to, a transmitter and transmitted by using the transmitter, and the input circuit and the output circuit may be a same circuit, where the circuit is used as the input circuit and the output circuit at different moments. Specific implementations of the processor and the various circuits are not limited in the embodiments of this application.

According to an eighth aspect, a processing apparatus is provided, and includes a processor and a memory. The processor is configured to: read instructions stored in the memory, receive a signal by using a receiver, and transmit a signal by using a transmitter, to perform the method according to any one of the first aspect, the second aspect, or the possible implementations of the first aspect or the second aspect.

Optionally, there are one or more processors and one or more memories.

Optionally, the memory and the processor may be integrated together, or the memory and the processor may be separately disposed.

In a specific implementation process, the memory may be a non-transitory (non-transitory) memory such as a read-only memory (read only memory, ROM). The memory and the processor may be integrated into a same chip, or may be disposed in different chips. A type of the memory and a manner in which the memory and the processor are disposed are not limited in this embodiment of this application.

It should be understood that a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the eighth aspect may be a chip. The processor may be implemented by using hardware, or may be implemented by using software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, may be located outside the processor, or may exist independently.

According to a ninth aspect, a computer program product is provided. The computer program product includes a computer program (also referred to as code or instructions). When the computer program is run, a computer is enabled to perform the method according to any one of the first aspect, the second aspect, or the possible implementations of the first aspect or the second aspect.

According to a tenth aspect, a computer-readable medium is provided. The computer-readable medium stores a computer program (also referred to as code or instructions). When the computer program is run on a computer, the computer is enabled to perform the method according to any one of the first aspect, the second aspect, or the possible implementations of the first aspect or the second aspect.

According to an eleventh aspect, a communication system is provided, and includes the foregoing network device and the foregoing terminal device.

DESCRIPTION OF EMBODIMENTS

Figure 1:
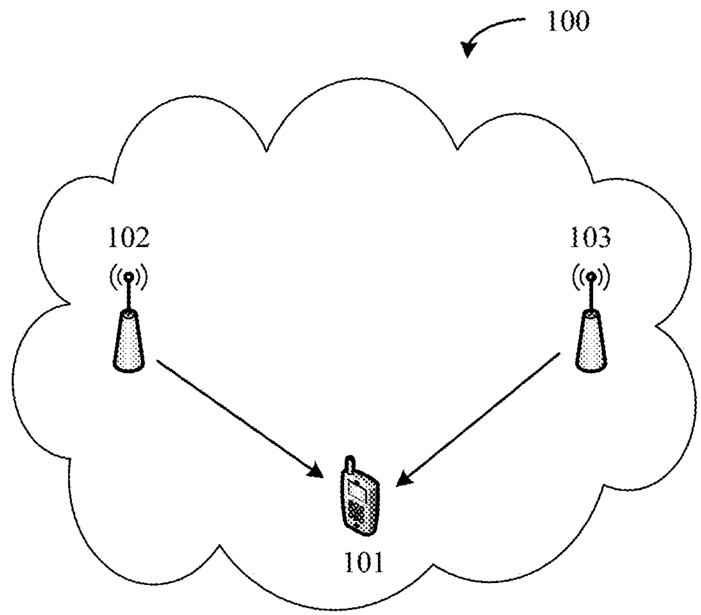
FIG. 1 is a schematic diagram of a communication system to which a data sending and receiving method according to an embodiment of this application is applicable.

The following describes technical solutions in this application with reference to accompanying drawings.

The technical solutions in embodiments of this application may be applied to various communication systems such as a global system for mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS) system, a worldwide interoperability for microwave access (WiMAX) communication system, a 5th generation 5G) system, or a new radio (NR) system.

It should be understood that a network device in the communication system may be any device having a wireless transceiver function or a chip that may be disposed in the device. The device includes but is not limited to an evolved NodeB (eNB), a radio network controller (RNC), a NodeB (NB), a base station controller (BSC), a base transceiver station (BTS), a home base station (for example, a Home evolved NodeB, or a Home NodeB, HNB), a baseband unit (BBU), an access point (AP) in a wireless fidelity (WIFI) system, a wireless relay node, a wireless backhaul node, a transmission point (TP), a transmission reception point (TRP), or the like, or may be a gNB or a transmission point (TRP or TP) in a 5G system such as an NR system, or an antenna panel or a group (including a plurality of antenna panels) of antenna panels of a base station in a 5G system, or may be a network node, for example, a baseband unit (BBU) or a distributed unit (DU), that constitutes a gNB or a transmission point.

In some deployments, the gNB may include a centralized unit (CU) and the DU. The gNB may further include a radio frequency unit (radio unit, RU). The CU implements a part of functions of the gNB, and the DU implements a part of the functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in the architecture, higher layer signaling such as RRC layer signaling or PHCP layer signaling may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

It should be further understood that a terminal device in the communication system may also be referred to as user equipment (UE), an access terminal, a subscriber unit, a subscriber station, a mobile station, a mobile station, a remote station, a remote terminal, a mobile device, a user terminal, a terminal, a wireless communication device, a user agent, or a user apparatus. The terminal device in the embodiments of this application may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application.

For ease of understanding of the embodiments of this application, several terms in this application are briefly described first.

1. Control resource set (CORESET) and control resource set group (CORESET group): The control resource set may be a resource set used to transmit downlink control information (DCI), and may also be referred to as a control resource area or a physical downlink control channel resource set.

Each control resource set may be a set of resource element groups (REG). The REG is a basic unit for performing physical resource allocation by using downlink control signaling, and is used to define mapping from the downlink control signaling to a resource element (RE). For example, it is stipulated in an LTE protocol that one REG includes four REs that are consecutive in frequency domain and that are of a non-reference signal (RS). It should be understood that the REG is merely a unit used for resource allocation, and shall not constitute any limitation on this application. This application does not exclude that a new resource allocation unit is defined in a future protocol to implement a same or similar function.

For a network device, the control resource set may be understood as a set of resources that may be used to send a PDCCH. For a terminal device, a resource corresponding to a search space of a PDCCH of each terminal device belongs to the control resource set. In other words, the network device may determine, in the control resource set, the resources used to send the PDCCH, and the terminal device may determine the search space of the PDCCH based on the control resource set.

The control resource set may include a time-frequency resource. For example, the control resource set may be a segment of bandwidth or one or more sub-bands in frequency domain, and the control resource set may be one or more symbols in time domain. The control resource set may be consecutive or non-consecutive resource units in time domain and frequency domain, for example, consecutive resource blocks (RB) or non-consecutive RBs.

It should be understood that specific content of the foregoing listed frequency domain resource, time domain resource, and time-frequency domain resource is merely used as an example for description, and should not be construed as any limitation on this application. For example, the RB is an example of the resource unit, and a size of the RB may be a resource defined in an NR protocol, or may be a resource defined in a future protocol, or may be replaced with another name. For another example, the control resource set may alternatively be one or more slots, radio frames, subframes, mini-slots (mini slot or sub slot), or transmission time intervals (TTI) in time domain. This is not particularly limited in the embodiments of this application.

For example, the control resource set may be configured by using a higher layer parameter such as a control resource set information element (ControlResourceSet information element). For example, the higher layer parameter may include an identifier (ID) of the control resource set, a frequency domain resource, and a quantity of symbols included in duration. A specific parameter used to configure the control resource set is not limited in this application.

In addition, the embodiments of this application propose the concept of the control resource set group. One control resource set group may include one or more control resource sets. For example, the control resource set included in the control resource set group may be configured by using the higher layer parameter. For example, the control resource set may be configured by using a PDCCH configuration information element (PDCCH-Config information element, PDCCH-Config IE), or may be configured by using the ControlResourceSet information element. This is not limited in this application.

2. Search space set and search space set group: The search space set may be a set of search spaces described from a perspective of a physical layer. For a higher layer, the search space set may also be referred to as a search space (SS), and is referred to as the search space set in this application for ease of distinguishing from a search space described below in the embodiments of this application.

The network device may configure the search space set by using a higher layer parameter, for example, may configure the search space set by using a search space information element (SearchSpace information element). For example, the higher layer parameter may include an identifier of the search space set, the identifier of the control resource set, a monitoring slot periodicity and offset, a monitoring symbol in a slot, and an aggregation level (AL). A specific parameter for configuring the search space is not limited in this application.

In addition, the embodiments of this application propose the concept of the search space set group. One search space set group may include one or more search space sets. For example, the search space set included in the search space set group may be configured by using the higher layer parameter, for example, may be configured by using the PDCCH-Config information element, or may be configured by using the SearchSpace information element. This is not limited in this application.

It should be noted that the SearchSpace information element herein is a higher layer parameter. For the physical layer, it may be considered that the higher layer parameter is used to configure the search space set. In the following, when configuration performed by using the higher layer parameter is involved, the search space may be understood as the search space set at the physical layer. For brevity, descriptions of a same or similar case are omitted below.

3. Search space: The search space is a search range of blind detection performed by the terminal device, or a set of candidate downlink control channels that need to be monitored by the terminal device. A physical resource in the search space may be jointly determined by the control resource set and the search space set. For example, the control resource set may indicate a frequency domain location and duration of the search space, and the search space set may indicate a start location, for example, a start slot, of the search space in time domain. In the embodiments of this application, the terminal device may determine, based on both a control resource set and a search space set that are configured in a PDCCH configuration, a time-frequency resource for blind detection of a PDCCH.

4. PDCCH configuration: The network device may configure a PDCCH parameter, for example, the control resource set, the control resource set group (CORESET group), the search space set, the search space set group (SS group), and another parameter that may be used for blind detection of the PDCCH, based on each bandwidth part (BWP) in each cell. For example, the PDCCH configuration may be configured by using the higher layer parameter such as the PDCCH-Config IE. For example, the PDCCH-Config IE may include a controlResourceSetToAddModList and a controlResourceSetToReleaseList.

Each list may include an identifier of one or more control resource sets. For example, the PDCCH-Config IE may further include a searchSpacesToAddModList and a searchSpacesToReleaseList. Each list may include an identifier of one or more search spaces.

Optionally, each PDCCH configuration may further indicate one or more control resource set groups and/or one or more search space groups. For example, the controlResourceSetToAddModList in the PDCCH-Config IE may include one or more control resource set groups and identifiers of control resource sets included in each control resource set group. For another example, the searchSpacesToAddModList in the PDCCH-Config IE may include one or more search space groups and identifiers of search spaces included in each search space group.

One or more search spaces may be determined by using the PDCCH configuration. In the embodiments of this application, for the terminal device, the PDCCH configuration of the PDCCH may be understood as a PDCCH configuration based on which the PDCCH is received. In other words, the terminal device blindly detects the PDCCH in a search space determined by using the PDCCH configuration. For the network device, the PDCCH configuration of the PDCCH may be understood as a PDCCH configuration based on which the PDCCH is sent. In other words, the network device sends the PDCCH on some resources in a search space determined by using the PDCCH configuration.

5. Cell and cell group: The cell may also be referred to as a serving cell. The cell may be understood as being described by a higher layer from a perspective of resource management, mobility management, or a service unit. Coverage of each network device may be divided into one or more serving cells, and the serving cell may be considered to include a frequency domain resource. In the embodiments of this application, the cell may be replaced with a serving cell or a component carrier (component carrier, CC, or referred to as a component carrier, a component carrier, a carrier, or the like). In the embodiments of this application, the terms “the cell”, “the serving cell”, and “the CC” are used alternately; and when a difference between the terms is not emphasized, meanings to be expressed by the terms are consistent.

It should be noted that the cell may be an area within coverage of a wireless network of a network device. In the embodiments of this application, different cells may correspond to different network devices. For example, a network device in a cell #1 and a network device in a cell #2 may be different network devices such as base stations. That is, the cell #1 and the cell #2 may be managed by different base stations. In this case, in other words, the cell #1 and the cell #2 are co-sited or co-sited. The network device in the cell #1 and the network device in the cell #2 may alternatively be different radio frequency processing units, for example, radio remote units (RRU), of a same base station. In other words, the cell #1 and the cell #2 may be managed by a same base station that has a same baseband processing unit and a same intermediate frequency processing unit, but has different radio frequency processing units. This is not specifically limited in this application.

A terminal device may obtain a cell identifier in advance. The network device may indicate the cell identifier to the terminal device by using higher layer signaling. For example, the terminal device may obtain the cell identifier in a downlink synchronization process. A specific method for obtaining the cell identifier by the terminal device is not limited in this application.

The cell group may also be referred to as a serving cell group. The cell group may be a set of one or more cells. The cells included in the cell group may be indicated by using higher layer signaling. For example, the network device may indicate, to the terminal device by using an RRC message, a cell included in each cell group.

In a same cell group, a backhaul link between network devices may be an ideal backhaul (ideal backhaul), and a plurality of network devices in a same cell group may cooperate with each other, and perform scheduling by using a piece of downlink control information (DCI). A backhaul link between network devices in different cell groups may be a non-ideal backhaul link, and the network devices in the different cell groups may perform scheduling by using DCI sent by the network devices.

The terminal device may obtain information about a cell group in advance. For example, the terminal device may determine in advance whether cells having a communication connection belong to a same cell group. The network device may indicate, to the terminal device by using higher layer signaling, a cell included in a cell group. For example, the network device may indicate, to the terminal device by using the higher layer signaling such as an RRC message, the cell included in the cell group.

6. Beam: The beam in an NR protocol may be embodied as a spatial domain filter (spatial filter) that is also referred to as a spatial filter or a spatial parameter. A beam used to send a signal may be referred to as a transmit beam (Tx beam), or may be referred to as a spatial transmit filter or a spatial transmit parameter. A beam used to receive a signal may be referred to as a receive beam (Rx beam), or may be referred to as a spatial receive filter (spatial domain receive filter) or a spatial receive parameter (spatial domain receive parameter).

The transmit beam may refer to distribution of signal strength formed in different directions in space after a signal is transmitted through an antenna, and the receive beam may refer to distribution of signal strength that is of a radio signal received from an antenna and that is in different directions in space.

7. Beam pairing relationship: The beam pairing relationship is a pairing relationship between the transmit beam and the receive beam, namely, a pairing relationship between the spatial transmit filter and the spatial receive filter. A relatively large beamforming gain can be obtained by transmitting a signal between the transmit beam and the receive beam that have the beam pairing relationship.

In an implementation, a transmit end (for example, the network device) and a receive end (for example, the terminal device) may obtain the beam pairing relationship through beam training. Specifically, the transmit end may send a reference signal in a beam sweeping manner, and the receive end may also receive a reference signal in the beam sweeping manner. Specifically, the transmit end may form different directional beams in space through beamforming, and may perform polling on a plurality of different directional beams, to transmit the reference signal by using the different directional beams, so that a power of transmitting the reference signal can reach a maximum value in a direction directed by the transmit beam. The receive end may also form different directional beams in space through beamforming, and may perform polling on a plurality of different directional beams, to receive the reference signal by using the different directional beams, so that a power for receiving the reference signal by the receive end can reach a maximum value in a direction directed by the receive beam.

By traversing each transmit beam and receive beam, the receive end may perform channel measurement based on the received reference signal, and report, through channel state information (CSI) to the transmit end, a result obtained through measurement. For example, the receive end may report, to the transmit end, a part of reference signal resources with relatively large reference signal received powers RSRP), for example, report an identifier of the reference signal resource, so that the transmit end sends and receives a signal by using a beam pairing relationship with relatively good channel quality during data or signaling transmission.

8. Transmission configuration indicator (TCI) state: The TCI state may be used to indicate a quasi-co-location (QCL) relationship between two types of reference signals. Each TCI state may include a serving cell index (ServeCellIndex), a bandwidth part (BWP) identifier (ID), and a reference signal resource identifier. The reference signal resource identifier may be, for example, at least one of the following: a non-zero-power (NZP) CSI-RS reference signal resource identifier (NZP-CSI-RS-ResourceId), a non-zero-power CSI-RS reference signal resource set identifier (NZP-CSI-RS-ResourceSetId), or an SSB index (SSB-Index).

The serving cell index, the BWP ID, and the reference signal resource identifier indicate a reference signal resource used in a beam training process, a corresponding serving cell, and a corresponding BWP. In the beam training process, the network device sends reference signals by using different transmit beams based on different reference signal resources, and therefore, the reference signals sent by using the different transmit beams may be associated with the different reference signal resources; the terminal device receives reference signals by using different receive beams based on different reference signal resources, and therefore, the reference signals received by using the different receive beams may also be associated with the different reference signal resources. In the beam training process, the terminal device may maintain a correspondence between each of the serving cell index, the BWP ID, and the reference signal resource identifier and the receive beam, and the network device may maintain a correspondence between each of the serving cell index, the BWP ID, the reference signal resource identifier and the transmit beam. The pairing relationship between the receive beam and the transmit beam may be established by using the reference signal resource identifier.

In a subsequent communication process, the terminal device may determine the receive beam based on a TCI state indicated by the network device, and the network device may determine the transmit beam based on a same TCI state.

Specifically, the network device may configure a TCI state list for the terminal device by using higher layer signaling (for example, an RRC message). The TCI state list may include a plurality of TCI states. Subsequently, the network device may activate one or more TCI states by using higher layer signaling (for example, a MAC CE). The one or more activated TCI states are a subset of the TCI state list configured by using the RRC message. Then, the network device may further indicate a selected TCI state by using a TCI field in physical layer signaling (for example, DCI). The DCI may be, for example, DCI for scheduling a physical downlink resource (for example, a PDSCH).

9. PDSCH configuration: The PDSCH configuration is used to configure a PDSCH parameter for the terminal device. The PDSCH parameter may include, for example, information such as a scrambling identity, a DMRS mapping type, a TCI state addition list, a TCI state release list, and resource allocation.

In addition, for ease of understanding of the embodiments of this application, the following descriptions are provided.

First, in this application, for ease of description, when numbering is involved, consecutive numbering may start from 0. For example, a $0^{th}$ symbol in a slot may be an initial symbol in the slot. Certainly, specific implementation is not limited thereto. For example, consecutive numbering may alternatively start from 1. For example, a first symbol in a slot may also be an initial symbol in the slot. Because start values of numbers are different, numbers corresponding to a same symbol in a slot are also different.

It should be understood that the foregoing descriptions are all provided for ease of describing the technical solutions provided in the embodiments of this application, but are not used to limit the scope of this application.

Second, in the embodiments shown below, "first", "second", and various numerical numbers are merely used for distinguishing for ease of description, and are not used to limit the scope of the embodiments of this application. For example, "first", "second", and the various numerical numbers are used to distinguish between different PDCCHs and different PDSCHs.

Third, in the embodiments shown below, "being pre-obtained" may include being indicated by the network device by using signaling or being predefined, for example, defined in a protocol. "Being predefined" may be implemented by prestoring corresponding code or a corresponding table in a device (for example, including the terminal device and the network device) or in another manner that may be used to indicate related information. A specific implementation of "being predefined" is not limited in this application.

Fourth, "store" in the embodiments of this application may be storage in one or more memories. The one or more memories may be separately disposed, or may be integrated into an encoder or a decoder, a processor, or a communication apparatus. Alternatively, a part of the one or more memories may be separately disposed, and a part of the one or more memories are integrated into a decoder, a processor, or a communication apparatus. A type of the memory may be a storage medium in any form. This is not limited in this application.

Fifth, a "protocol" in the embodiments of this application may be a standard protocol in the communication field, for example, may include an LTE protocol, an NR protocol, and a related protocol applied to a future communication system. This is not limited in this application.

Sixth, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, and c may represent: a, b, c, a and b, a and c, b and c, or a, b, and c, where a, b, and c each may be singular or plural.

For ease of understanding of the embodiments of this application, the following uses a communication system shown in FIG. 1 as an example to describe in detail a communication system to which a data sending and receiving method according to an embodiment of this application is applicable. FIG. 1 is a schematic diagram of a communication system 100 to which a data sending and receiving method according to an embodiment of this application is applicable. As shown in the figure, the communication system 100 may include at least one terminal device such as a terminal device 101 shown in the figure. The communication system 100 may further include at least one network device such as a network device #1 102 or a network device #2 103 shown in the figure.

Optionally, the communication system 100 may include a plurality of network devices such as the network device #1 102 and the network device #2 103 shown in the figure. The network device #1 102 and the network device #2 103 may be network devices in a same cell, or may be network devices in different cells. This is not limited in this application. The figure is merely an example, and shows an example in which the network device #1 102 and the network device #2 103 are located in the same cell.

In the communication system 100, the network device #1 102 and the network device #2 103 may communicate with each other through a backhaul (backhaul) link. The backhaul link may be a wired backhaul link (for example, an optical fiber or a copper cable), or may be a wireless backhaul link (for example, a microwave). The network device #1 102 and the network device #2 103 may collaborate with each other to provide a service for the terminal device 101. Therefore, the terminal device 101 may separately communicate with the network device #1 102 and the network device #2 103 through a wireless link.

In addition, one or more of the network device #1 102 and the network device #2 103 may separately schedule a PDSCH for the terminal device 101 on one or more CCs by using a carrier aggregation technology. For example, the network device #1 102 may schedule a PDSCH for the terminal device 101 on a CC #1 and a CC #2, and the network device #2 103 may schedule a PDSCH for the terminal device 101 on the CC #1 and a CC #3. CCs on which the network device #1 102 and the network device #2 103 perform scheduling may be the same, or may be different. This is not limited in this application.

A communication latency between network devices that collaborate with each other may be classified into an ideal backhaul and a non-ideal backhaul. A communication latency between two sites in an ideal backhaul may be at a microsecond level, and can be ignored compared with that in millisecond-level scheduling in NR. A communication latency between two sites in a non-ideal backhaul may be at a millisecond level, and cannot be ignored compared with that in millisecond-level scheduling in NR.

Therefore, a multi-site scheduling solution based on a plurality of pieces of DCI is proposed. In the multi-site scheduling solution based on the plurality of pieces of DCI, a plurality of network devices can separately schedule respective PDSCHs for a terminal device by using DCI sent by the plurality of network devices, to transmit data. The PDSCHs may completely overlap, partially overlap, or not overlap in a time domain resource and/or a frequency domain resource. Optionally, UE independently demodulates, based on the DCI sent by the network devices, the PDSCHs scheduled by using the DCI. Optionally, the UE separately feeds back, to the corresponding network devices, acknowledgment (ACK) information/negative acknowledgment (NACK) information corresponding to the PDSCHs sent by the different network devices. That is, the UE may receive a plurality of PDCCHs scrambled by using a cell radio network temporary identifier (C-RNTI) and/or a modulation and coding scheme (MCS)-C-RNTI, and the PDCCHs may be separately used to schedule PDSCHs that completely overlap, partially overlap, or do not overlap in time domain and/or frequency domain. Optionally, the UE independently demodulates, based on each PDCCH, a PDSCH corresponding to the PDCCH. Optionally, the UE separately feeds back, based on attributes of the PDCCHs, ACK information/NACK information corresponding to the PDSCHs scheduled by using the PDCCHs.

Because the network devices are transparent to the terminal device, the terminal device may receive a plurality of pieces of DCI, but does not know whether the plurality of pieces of DCI are from one network device or a plurality of network devices. Therefore, such a multi-site scheduling solution based on the plurality of pieces of DCI may also be referred to as a multi-DCI scheduling solution.

For example, the network device #1 102 in FIG. 1 may send a PDCCH #1 to the terminal device 101, the PDCCH #1 may carry DCI #1, and the DCI #1 may be used to schedule a PDSCH #1 for the terminal device 101. The network device #2 103 in FIG. 1 may also send a PDCCH #2 to the terminal device 101, the PDCCH #2 may carry DCI #2, and the DCI #2 may be used to schedule a PDSCH #2 for the terminal device 101. The PDSCH #1 and the PDSCH #2 may overlap or not overlap in terms of resources. The network device #1 102 and the network device #2 103 may separately send the PDSCHs to the terminal device in a spatial multiplexing transmission mode.

However, in some cases, a network device such as the network device #1 102 may urgently schedule a PDSCH for the terminal device by using another PDCCH based on some urgent services such as an ultra-reliable low-latency communication (ultra reliable and low latency communication, URLLC) service. The PDCCH may be, for example, denoted as a PDCCH #3, and the PDSCH may be, for example, denoted as a PDSCH #3. A resource of the PDCCH #3 may overlap a resource of the PDSCH #1 previously scheduled by the network device #1 102, and a resource of the PDSCH #3 may also overlap the resource of the PDSCH #1 previously scheduled by the network device #1 102. If the network device #1 102 does not perform any processing, the terminal may be interfered, when receiving the PDCCH #3 or the PDSCH #3, by data transmitted on the PDSCH #1. The interference may cause failed decoding of the PDCCH #3 or the PDSCH #3. Correspondingly, the PDCCH #3 or the PDSCH #3 may also cause interference to the data transmitted on the PDSCH #1. Consequently, receiving quality of the PDSCH #1 deteriorates, and even decoding fails. Consequently, data transmission performance and system performance may deteriorate.

In view of this, this application provides a data sending and receiving method, to improve data transmission performance.

The following describes, in detail with reference to the accompanying drawings, the data sending and receiving method provided in the embodiments of this application.

Figure 2:
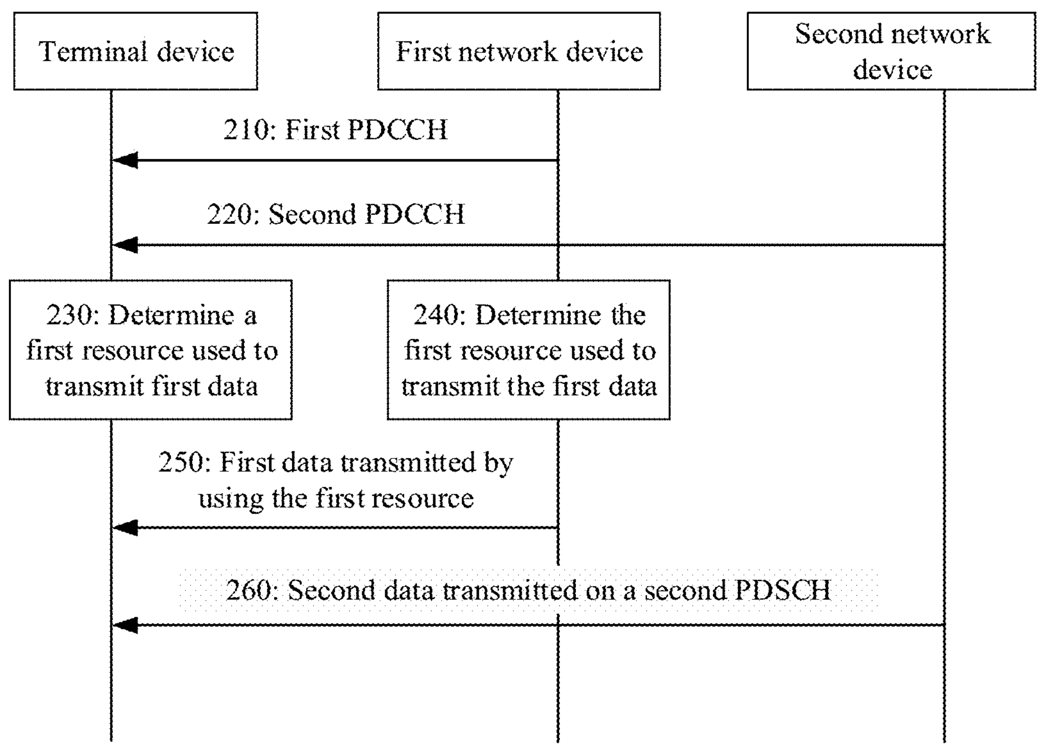
FIG. 2 is a schematic flowchart of a data sending and receiving method according to an embodiment of this application.

FIG. 2 is a schematic flowchart of a data sending and receiving method 200 according to an embodiment of this application from a perspective of device interaction. As shown in the figure, the method 200 may include step 210 to step 260. The following describes the steps in the method 200 in detail.

It should be noted that the data sending and receiving method provided in this application may be applied to a wireless communication system such as the communication system 100 shown in FIG. 1. There may be a wireless communication connection relationship between communication apparatuses in the communication system. For example, as shown in FIG. 1, the terminal device 101 may separately have a wireless communication connection relationship with the network device #1 102 and the network device #2 103. There may be an ideal backhaul link or a non-ideal backhaul link between the network device #1 102 and the network device #2 103. This is not limited in this application.

When there is the ideal backhaul link between the network device #1 102 and the network device #2 103, it may be considered that the network device #1 102 and the network device #2 103 belong to a same network device group. When there is the non-ideal backhaul link between the network device #1 102 and the network device #2 103, it may be considered that the network device #1 102 and the network device #2 103 belong to different network device groups. For example, network devices in a same network device group may perform scheduling by using a piece of DCI, or may perform scheduling by using a scheduling entity, or may send PDCCHs based on a same PDCCH configuration.

A first network device shown below may correspond to, for example, the network device #1 102 in FIG. 1, and a second network device shown below may correspond to, for example, the network device #2 103 in FIG. 1. For ease of description, the following separately describes in detail, by using an example in which the first network device and the second network device are a same network device or different network devices, the data sending and receiving method provided in the embodiments of this application. It should be understood that, in the embodiments shown below, that the first network device and the second network device are the same network device may be replaced with that the first network device and the second network device belong to a same network device group; that the first network device and the second network device are the different network devices may be replaced with that the first network device and the second network device belong to different network device groups.

In step 210, a terminal device receives a first PDCCH, where the first PDCCH may be used to schedule a first PDSCH.

For ease of differentiation and description, a PDCCH received by the terminal device in step 210 is denoted as the first PDCCH, and a PDSCH scheduled by using the first PDCCH is denoted as the first PDSCH. The first PDCCH may be, for example, a PDCCH sent by any one of one or more network devices to the terminal device. The network device that sends the first PDCCH is, for example, denoted as a first network device. That is, in step 210, the first network device sends the first PDCCH. In other words, the first PDSCH is a physical downlink resource scheduled by the first network device for the terminal device by using the first PDCCH.

Specifically, DCI may be transmitted on the first PDCCH. For ease of differentiation, the DCI transmitted on the first PDCCH is denoted as first DCI. The first DCI may include information, for example a time-frequency resource, an antenna port, and a PDSCH mapping type, of the first PDSCH scheduled by using the first DCI.

In this embodiment, the first PDSCH may be used to transmit first data. Optionally, the first data is data of a service other than an urgent service, data of a non-urgent service, or data with a relatively low transmission priority. By way of example rather than limitation, the first data is data of an enhanced mobile broadband (enhanced mobile broadband, eMBB) service.

In step 220, the terminal device receives a second PDCCH.

For ease of differentiation and description, a PDCCH received by the terminal device in step 220 is denoted as the second PDCCH, and DCI transmitted on the second PDCCH is denoted as second DCI. The second PDCCH may be sent by the foregoing first network device to urgently schedule a resource for the terminal device based on some urgent services such as a URLLC service, or may be sent by another network device such as the second network device.

For the terminal device, a network device is transparent. The terminal device cannot learn of, in advance, which one or more network devices send a PDCCH and a PDSCH to the terminal device. For ease of differentiation and description, a network device that sends the second PDCCH to the terminal device in step 220 is denoted as the second network device. That is, in step 220, the second network device sends the second PDCCH.

It should be understood that the second network device and the foregoing first network device may be the same network device, or may be the different network devices. The first network device and the second network device may belong to the same network device group, or may belong to the different network device groups. The following describes in detail a specific process in which the terminal device determines, based on the method provided in this embodiment of this application, whether the first network device and the second network device are the same network device or belong to the same network device group. Detailed description of the specific process is temporarily omitted herein.

It should be further understood that the figure is merely an example, and that the first network device and the second network device are shown as two different network devices shall not constitute any limitation on this application. When the first network device or the second network device is the same network device, steps performed by the first network device and the second network device in the figure may be performed by the same network device, for example, the first network device.

In step 230, the terminal device determines, based on the first PDCCH and the second PDCCH, a first resource used to transmit the first data.

Specifically, the terminal device may determine, based on the first PDSCH scheduled by using the first PDCCH and the second PDCCH, the first resource used to transmit the first data. The first resource belongs to the first PDSCH. In other words, the first resource may be a part or all of a resource of the first PDSCH. In other words, the first network device may indicate, to the terminal device by using the first PDCCH, a range of a resource used to transmit the first data, and the terminal device may further determine, in the range of the resource with reference to the second PDCCH, the first resource used to transmit the first data.

Optionally, the second PDCCH is used to schedule a second PDSCH.

For ease of distinguishing, a PDSCH scheduled by using the second PDCCH is denoted as the second PDSCH. The DCI on the second PDCCH may include information, for example a time-frequency resource, an antenna port, and a PDSCH mapping type, of the second PDSCH scheduled by using the DCI.

Figure 3:
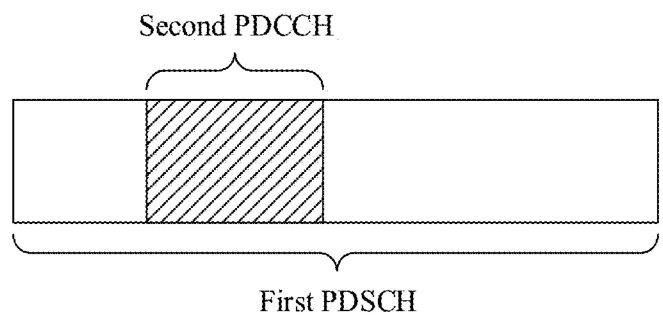
FIG. 3 to FIG. 5 each are a schematic diagram of resource locations of a first PDSCH, a second PDCCH, and a second PDSCH according to an embodiment of this application.
Figure 4:
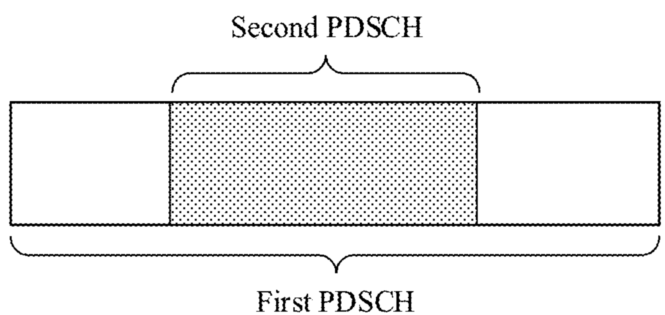
Figure 5:
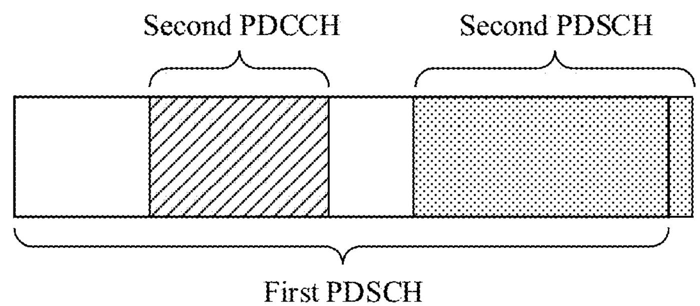

For ease of understanding, FIG. 3 to FIG. 5 each are a schematic diagram of resource distribution of the second PDCCH, the first PDSCH, and the second PDSCH. However, it should be understood that what is shown in the figure is merely for ease of understanding, and shall not constitute any limitation on this application.

Optionally, when a resource of the second PDCCH overlaps the resource of the first PDSCH, step 230 specifically includes: determining, by the terminal device as the first resource, a resource other than the second PDCCH in the first PDSCH.

As shown in FIG. 3, all of the resource of the second PDCCH falls within a range of the first PDSCH. It should be understood that FIG. 3 shows only an example, and a size of an overlapping area between the second PDCCH and the first PDSCH and an overlapping location are not limited in this application. That a resource of the second PDCCH overlaps the resource of the first PDSCH may specifically include: A part of the resource of the second PDCCH overlaps the first PDSCH, or all of the resource of the second PDCCH overlaps the first PDSCH. In addition, the resource of the second PDCCH may overlap the resource of the first PDSCH at a start location of the first PDSCH, or may overlap the resource of the first PDSCH at an end location of the first PDSCH, or may overlap the resource of the first PDSCH at a middle location of the first PDSCH, or may overlap the resource of the first PDSCH at all locations of the first PDSCH. This is not limited in this application.

When the resource of the second PDCCH overlaps the resource of the first PDSCH, the terminal device may determine, as the first resource, the resource other than the second PDCCH in the first PDSCH.

In other words, when detecting the second PDCCH in a process of receiving the first PDSCH, the terminal device may determine the first resource based on the resource occupied by the first PDSCH and indicated by the first PDCCH and the resource occupied by the second PDCCH, and receive and demodulate the first data on the determined first resource, and may receive and demodulate second data on the second PDSCH based on the second PDCCH.

Optionally, when a resource of the second PDSCH overlaps the resource of the first PDSCH, step 230 specifically includes: determining, by the terminal device as the first resource, a resource other than the second PDSCH in the first PDSCH.

As shown in FIG. 4, all of the resource of the second PDSCH falls within a range of the first PDSCH. It should be understood that FIG. 4 shows only an example, and a size of an overlapping area between the second PDSCH and the first PDSCH and an overlapping location are not limited in this application. That a resource of the second PDSCH overlaps the resource of the first PDSCH may specifically include: A part of the resource of the second PDSCH overlaps the first PDSCH, or all of the resource of the second PDSCH overlaps the first PDSCH. In addition, the resource of the second PDSCH may overlap the resource of the first PDSCH at a start location of the first PDSCH, or may overlap the resource of the first PDSCH at an end location of the first PDSCH, or may overlap the resource of the first PDSCH at a middle location of the first PDSCH, or may overlap the resource of the first PDSCH at all locations of the first PDSCH. This is not limited in this application.

When the resource of the second PDSCH overlaps the resource of the first PDSCH, the terminal device may determine, as the first resource, the resource other than the second PDSCH in the first PDSCH. In other words, when determining that the second PDSCH arrives during receiving of the first PDSCH, the terminal device may determine the first resource based on the resource occupied by the first PDSCH and indicated by the first PDCCH and the resource occupied by the second PDSCH and indicated by the second PDCCH, may receive and demodulate the first data on the determined first resource, and receive and demodulate second data on the second PDSCH based on the second PDCCH.

Optionally, when both a resource of the second PDCCH and a resource of the second PDSCH overlap the resource of the second PDCCH, step 230 specifically includes: determining, by the terminal device as the first resource, a resource other than the second PDCCH and the second PDSCH in the first PDSCH.

As shown in FIG. 5, all of resources of the second PDCCH and the second PDSCH fall within a range of the first PDSCH. It should be understood that FIG. 5 shows only an example, and a size of an overlapping area between the second PDCCH and the first PDSCH, a size of an overlapping area between the second PDSCH and the first PDSCH, and overlapping locations are not limited in this application. That both a resource of the second PDCCH and a resource of the second PDSCH overlap the resource of the first PDSCH may specifically include: A part of the resource of the second PDCCH overlaps the first PDSCH, and a part of the resource of the second PDSCH overlaps the first PDSCH; or all of the resource of the second PDCCH overlaps the first PDSCH, and a part of the resource of the second PDSCH overlaps the first PDSCH; or a part of the resource of the second PDCCH overlaps the first PDSCH, and all of the resource of the second PDSCH overlaps the first PDSCH; or all of the resource of the second PDCCH overlaps the first PDSCH, and all of the resource of the second PDSCH overlaps the first PDSCH. In addition, the resource of the second PDCCH may overlap the resource of the first PDSCH at a start location of the first PDSCH, and the resource of the second PDSCH may overlap the resource of the first PDSCH at a middle location or an end location of the first PDSCH; or the resource of the second PDCCH may overlap the resource of the first PDSCH at a middle location of the first PDSCH, and the resource of the second PDSCH may overlap the resource of the first PDSCH at a middle location or an end location of the first PDSCH; or the resource of the second PDCCH and the resource of the second PDSCH may overlap the resource of the first PDSCH at all locations of the first PDSCH. This is not limited in this application.

When both the resource of the second PDCCH and the resource of the second PDSCH overlap the resource of the second PDCCH, the terminal device may determine, as the first resource, the resource other than the second PDCCH and the second PDSCH in the first PDSCH.

In other words, in a process of receiving the first PDSCH, the terminal device detects the second PDCCH, and determines, based on the second PDCCH, that the resource of the second PDSCH overlaps the resource of the first PDSCH. In this case, the terminal device may determine the first resource based on the resource occupied by the first PDSCH and indicated by the first PDCCH, the resource occupied by the second PDCCH, and the resource occupied by the second PDSCH and indicated by the second PDCCH, and receive and demodulate the first data on the first resource. The terminal device may further receive and demodulate second data on the resource occupied by the second PDSCH.

In a process of determining the first resource, the terminal device may remove a part of the resource, overlapping the second PDCCH and/or the second PDSCH, in the first PDSCH. A resource other than the second PDCCH and/or the second PDSCH in the first PDSCH may be used as the first resource. This may be understood as that the terminal device discards the part of the resource, overlapping the second PDCCH and/or the second PDSCH, in the first PDSCH, or the terminal device discards a part of the resource of the first PDSCH.

When discarding the overlapping resource from the first PDSCH, the terminal device may use a time-frequency unit as a unit, for example, use a resource block (resource block, RB) as a granularity, or may use a time-domain unit as a unit, for example, use a symbol as a granularity. For example, when the first PDSCH and the second PDCCH overlap on an RE, an RB in which the RE is located may be removed from the first PDSCH. For another example, when the first PDSCH and the second PDSCH overlap on an RE, a physical resource on a symbol on which the RE is located may be removed from the first PDSCH.

It should be understood that resource processing granularities listed herein are merely examples, and should not constitute any limitation on this application.

Optionally, when neither a resource of the second PDCCH nor a resource of the second PDSCH overlaps the resource of the second PDCCH, step 230 specifically includes: when neither the resource of the second PDCCH nor the resource of the second PDSCH overlaps the resource of the first PDSCH, determining, as the first resource, the first PDSCH scheduled by using the first PDCCH.

That is, when the resource of the first PDSCH overlaps neither the resource of the second PDCCH nor the resource of the second PDSCH, the first PDSCH may be directly determined based on the first PDCCH. In this case, the first resource may be all of the resource of the first PDSCH.

In step 240, the first network device determines the first resource used to transmit the first data.

If the first PDCCH and the second PDCCH are sent by a same network device, the first network device may know in advance. In this case, the first network device may determine, based on the method in step 230, the first resource used to transmit the first data.

Based on the method for determining the first resource in step 230, when determining that the resource of the first PDSCH overlaps either of the resource of the second PDCCH and the resource of the second PDSCH, the first network device may determine, as the first resource, a resource other than a resource in a resource overlapping area in the first PDSCH. The resource overlapping area may be, for example, an overlapping area between the first PDSCH and the second PDCCH, or may be an overlapping area between the first PDSCH and the second PDSCH, or may be an overlapping area between the first PDSCH and both the second PDCCH and the second PDSCH. This is not limited in this application.

In other words, the first network device may not send the first data in the resource overlapping area, but preferentially send the second PDCCH and/or the second PDSCH.

The terminal device does not expect that the resource of the first PDSCH overlaps either of the resource of the second PDCCH and/or the resource of the second PDSCH. Therefore, when scheduling a resource, the first network device may avoid the first resource overlapping either of the resource of the second PDCCH and the resource of the PDSCH.

Further, there may be a scheduling rule. For example, the terminal device does not expect that a PDSCH scheduled by using a PDCCH first received is received later.

For example, it is assumed that the PDCCH first received by the terminal device is the first PDCCH, and a PDCCH later received by the terminal device is the second PDCCH. Optionally, the terminal device does not expect that a start symbol location of the second PDSCH scheduled by using the second PDCCH is earlier than an end symbol location of the first PDSCH scheduled by using the first PDCCH. Optionally, the terminal device does not expect that a start symbol location of the second PDSCH scheduled by using the second PDCCH is earlier than a start symbol location of the first PDSCH scheduled by using the first PDCCH. In other words, the terminal device expects to receive the first PDSCH before the second PDSCH.

In other words, the network device may schedule the first PDSCH and the second PDSCH based on the scheduling rule, so that the scheduled first PDSCH and second PDSCH can meet the foregoing requirement.

If the first PDCCH and the second PDCCH are sent by different network devices, the first network device may not know that there is another network device serving the terminal device. In this case, the first network device may still directly transmit the first data by using the first PDSCH based on a conventional technology, and does not need to re-determine the first resource used to transmit the first data.

In step 250, the terminal device receives the first data on the first resource. Correspondingly, the first network device sends the first data on the first resource.

In other words, regardless of whether the first network device and the second network device are the same network device, the terminal device does not expect that the first resource overlaps either of the resource of the second PDCCH and the resource of the second PDSCH. In other words, the terminal device does not expect to receive the first data on the second PDCCH or on the second PDSCH simultaneously.

In other words, the terminal device may not receive the first data in a resource overlapping area, to ensure successful reception of the second PDCCH and/or the second PDSCH.

Optionally, in step 260, the terminal device receives the second data on the second PDSCH.

If the first network device and the second network device are the same network device, in step 260, the first network device sends the second data on the second PDSCH. If the first network device and the second network device are the different network devices, in step 260, the second network device sends the second data on the second PDSCH.

In NR, a plurality of services may coexist. When some services that have a high transmission priority and that may be urgent services, for example, a URLLC service, arrive, a network device may urgently schedule a resource, to ensure that the urgent services are preferentially transmitted. In this embodiment, optionally, the second data is data of the urgent service. By way of example rather than limitation, the second data is data of the URLLC service.

It should be understood that, that the second data is the data of the urgent service is merely a possibility, and shall not constitute any limitation on this application. Alternatively, the second data may be data of a non-urgent service, for example, the data of the foregoing eMBB service.

It may be understood that, when the first network device and the second network device are the same network device, the first network device usually does not schedule, when data that is of an eMBB service and that is transmitted by scheduling a PDSCH (for example, the first PDSCH) last time is not completed, another PDSCH (for example, the second PDSCH) to transmit data of a new eMBB service.

When the first network device and the second network device are the different network devices, the first data and the second data may be data of different service types, or may be data of a same service type. This is not limited in this application. For example, the first data is data of a non-urgent service, and the second data is data of an urgent service. When receiving scheduling of the urgent service, the terminal device may preferentially receive the second data, thereby ensuring reliable transmission of the second data. As described above, when the resource of the first PDSCH overlaps either of the resource of the second PDCCH and the resource of the second PDSCH, the terminal device preferentially receives the second PDCCH and/or the second PDSCH, that is, preferentially receives the second data. Therefore, successful reception of the data of the urgent service can be ensured, thereby ensuring transmission reliability.

Optionally, when both a service type of data transmitted on the first PDSCH and a service type of data transmitted on the second PDSCH are non-urgent services, the first PDSCH and the second PDSCH may be from different network devices or different network device groups. The first network device and the second network device may transmit different data in a spatial multiplexing transmission mode.

Because different service types may be associated with mapping types of time domain resource locations of PDSCHs, optionally, when both a mapping type of a time domain resource location of the first PDSCH and a mapping type of a time domain resource location of the second PDSCH are a type A, the first PDSCH and the second PDSCH may be from different network devices or different network device groups. The first network device and the second network device may transmit different data in a spatial multiplexing transmission mode.

In this case, the terminal device may determine the first PDSCH based on the first PDCCH, and receive the first data on the first PDSCH. The terminal device may further determine the second PDSCH based on the second PDCCH, and receive the second data on the second PDSCH. The terminal device may separately demodulate the received first data and second data.

Optionally, when both a service type of data transmitted on the first PDSCH and a service type of data transmitted on the second PDSCH are urgent services, the first PDSCH and the second PDSCH may also be from different network devices. The first network device and the second network device may transmit same data in a diversity transmission mode. That is, the first data and the second data may be same data.

Because different service types may be associated with mapping types of time domain resource locations of PDSCHs, optionally, when both a mapping type of a time domain resource location of the first PDSCH and a mapping type of a time domain resource location of the second PDSCH are a type B, the first PDSCH and the second PDSCH may also be from different network devices or different network device groups. The first network device and the second network device may transmit same data in a diversity transmission mode.

In this case, the terminal device may determine the first PDSCH based on the first PDCCH, and receive the first data on the first PDSCH. The terminal device may further determine the second PDSCH based on the second PDCCH, and receive the second data on the second PDSCH. The terminal device may jointly demodulate the received data.

Optionally, when both a service type of data transmitted on the first PDSCH and a service type of data transmitted on the second PDSCH are urgent services, or in other words, when both a mapping type of a time domain resource location of the first PDSCH and a mapping type of a time domain resource location of the second PDSCH are a type B, the first PDSCH and the second PDSCH may also be from different network devices.

Alternatively, the terminal device may separately determine, based on the first PDCCH and the second PDCCH, the first resource used to transmit the first data, and receive the first data on the first resource. The terminal device may determine the second PDSCH based on the second PDCCH, and receive the second data on the second PDSCH. The terminal device may separately demodulate the received first data and second data.

Alternatively, the terminal device may determine the first PDSCH based on the first PDCCH, and receive the first data on the first PDSCH; and may determine the second PDSCH based on the second PDCCH, and receive the second data on the second PDSCH. The terminal device may separately demodulate the received first data and second data.

Optionally, when a service type of data transmitted on the first PDSCH is a non-urgent service, and a service type of data transmitted on the second PDSCH is an urgent service, the first PDSCH and the second PDSCH may be from a same network device or from a same network device group, or may be from different network devices in a same network device group or from different network device groups.

Because different service types may be associated with mapping types of time domain resource locations of PDSCHs, optionally, when a mapping type of a time domain resource location of the first PDSCH is a type A, and a mapping type of a time domain resource location of the second PDSCH is a type B, the first PDSCH and the second PDSCH may be from a same network device or from a same network device group, or may be from different network devices or from different network device groups.

In this case, the terminal device may determine, based on the first PDCCH and the second PDCCH, the first resource used to transmit the first data, and receive the first data on the first resource. The terminal device may determine the second PDSCH based on the second PDCCH, and receive the second data on the second PDSCH. The terminal device may separately demodulate the received first data and second data.

Actually, when the first PDSCH and the second PDSCH are from the different network devices, the first network device and the second network device may send data to the terminal device through, for example, spatial multiplexing. The terminal device may receive data by using different receive beams. Therefore, when the first network device and the second network device are the different network devices, the first network device and the second network device may separately send downlink data to the terminal device. In this case, the second data transmitted by the second network device may be data of a non-urgent service, for example, data of an eMBB service, or may be data of an urgent service, for example, data of a URLLC service. This is not limited in this application. In other words, when the first network device and the second network device are the different network devices, or when the first network device and the second network device belong to the different network device groups, the second PDCCH and the second PDSCH may overlap the first PDSCH. When the first network device and the second network device are the same network device, or when the first network device and the second network device belong to the same network device group, the terminal device does not expect that either of the resource of the second PDCCH and the resource of the second PDSCH overlaps the resource of the first PDSCH.

Optionally, step 230 further includes: when the first PDCCH and the second PDCCH meet a preset condition, determining, by the terminal device based on the first PDCCH and the second PDCCH, the first resource used to transmit the first data.

Optionally, step 230 further includes: when the first PDCCH and the second PDCCH do not meet a preset condition, demodulating, by the terminal device, the first PDSCH based on the first PDCCH, and demodulating the second PDSCH based on the second PDCCH.

In other words, the terminal device may determine, by using the preset condition, whether the first resource used to transmit the first data is the first PDSCH or the part of the resource other than the second PDCCH and/or the second PDSCH in the first PDSCH. When the first PDCCH and the second PDCCH meet the preset condition, the terminal device may receive the first data on the part of the resource other than the resource overlapping the second PDCCH and/or the second PDSCH in the first PDSCH, and receive the second data on the second PDSCH. When the first PDCCH and the second PDCCH do not meet the preset condition, the terminal device may receive the first data on the first PDSCH, and receive the second data on the second PDSCH.

That the terminal device removes the part of the resource, overlapping the second PDCCH and/or the second PDSCH, in the first PDSCH may be understood as that the terminal device discards the part of the resource, overlapping the second PDCCH and/or the second PDSCH, in the first PDSCH, or the terminal device discards the part of the resource of the first PDSCH. Therefore, when the first PDCCH and the second PDCCH meet the preset condition, the terminal device may discard a part of the resource of the first PDSCH, to receive the second PDCCH and/or the second PDSCH on the discarded part of the resource. Otherwise, the terminal device may separately receive the first PDSCH and the second PDSCH.

Optionally, the preset condition may be used to determine whether the first network device and the second network device are the same network device or belong to the same network device group.

When there is a non-ideal backhaul link between the first network device and the second network device, the first network device and the second network device may separately perform scheduling by using respective PDCCHs.

Therefore, when determining that the first network device and the second network device are the same network device, the terminal device may determine that the first PDCCH and the second PDCCH are from the same network device, and may also determine that the first PDSCH and the second PDSCH are from the same network device. In this case, the terminal device does not expect that the first resource overlaps either of the resource of the second PDCCH and the resource of the second PDSCH. The terminal device may discard a part of the resource of the first PDSCH in the manner described above with reference to step 230 and the accompanying drawings, to receive the second PDCCH and/or the second PDSCH on the part of the resource.

When determining that the first network device and the second network device are the different network devices, the terminal device may determine that the first PDCCH and the second PDCCH are from the different network devices, and may also determine that the first PDSCH and the second PDSCH are from the different network devices. In this case, the terminal device may separately receive data from the different network devices on the first PDSCH and the second PDSCH. The first data transmitted on the first PDSCH and the second data transmitted on the second PDSCH may be independent of each other. The terminal device may separately decode and demodulate the received first data and second data.

It should be noted that, merely for ease of description, the foregoing describes the data sending and receiving method based on the assumption that there is the non-ideal backhaul link between the first network device and the second network device. When there is an ideal backhaul link between the first network device and the second network device, the first network device and the second network device may perform scheduling by using one PDCCH. In this case, although the first network device and the second network device are the different network devices, preset conditions listed below may still be met. Therefore, whether the first network device and the second network device are the same network device described in the foregoing embodiment may be replaced with whether the first network device and the second network device belong to the same network device group. For example, that the first network device and the second network device are the same network device may be replaced with that the first network device and the second network device are from the same network device group. For another example, that the first network device and the second network device are the different network devices may be replaced with that the first network device and the second network device are from the different network device groups.

Optionally, the preset condition may be used to determine whether the first network device and the second network device are from the same network device group.

One network device group may include one or more network devices. It may be considered that there is an ideal backhaul between network devices in a same network device group. Therefore, one or more network devices in the same network device group may perform scheduling by using one piece of DCI, or may perform scheduling by using one scheduling entity, or may send a PDCCH based on a same PDCCH configuration, or the like. It may be considered that there is a non-ideal backhaul between network devices in different network device groups. Therefore, the network devices in the different network device groups may separately perform scheduling by using respective PDCCHs.

It should be understood that the foregoing lists two possible understandings of the preset condition, and shall not constitute any limitation on this application. When in a protocol, it is determined that whether to determine the first resource with reference to the first PDCCH and the second PDCCH is determined by using one or more preset conditions, the terminal device does not care whether the first PDCCH and the second PDCCH are from the same network device or the different network devices, and does not care whether the first PDCCH and the second PDCCH are from a same network device group or different network device groups.

The following describes in detail that the terminal device determines whether the first PDCCH and the second PDCCH meet the preset condition.

It should be noted that the following listed items may be used separately, or may be used in combination with a plurality of items, to determine whether the first resource needs to be re-determined based on the first PDCCH and the second PDCCH. In the protocol, the preset condition may be predefined. For example, the preset condition may be one of the conditions listed below, or may be a combination of a plurality of conditions listed below, or may be another condition other than the conditions listed below. This is not limited in this application. Herein, merely for ease of understanding, several possible preset conditions are provided as examples, and should not constitute any limitation on this application.

Optionally, when a PDCCH configuration of the first PDCCH is the same as a PDCCH configuration of the second PDCCH, the terminal device determines that the first PDCCH and the second PDCCH meet the preset condition.

In other words, when the first PDCCH and the second PDCCH meet the preset condition, the first PDCCH and the second PDCCH may have a same PDCCH configuration. In other words, the PDCCH configuration of the first PDCCH and the PDCCH configuration of the second PDCCH belong to the same PDCCH configuration.

As described above, a PDCCH configuration may be used to determine one or more search spaces. For the terminal device, a PDCCH configuration of a PDCCH may be understood as a PDCCH configuration based on which the PDCCH is received. In other words, the terminal device may blindly detect the PDCCH in a search space determined by using the PDCCH configuration. For the network device, a PDCCH configuration of a PDCCH may be understood as a PDCCH configuration based on which the PDCCH is sent. In other words, the network device may send the PDCCH on some resources in a search space determined by using the PDCCH configuration.

When the terminal device determines that a search space in which the first PDCCH is blindly detected and a search space in which the second PDCCH is blindly detected are based on a same PDCCH configuration, it may be considered that the PDCCH configuration of the first PDCCH is the same as the PDCCH configuration of the second PDCCH.

In this embodiment, different network devices may send PDCCHs based on different PDCCH configurations. In other words, each network device may correspond to one PDCCH configuration. When the first network device and the second network device are the same network device, the first PDCCH and the second PDCCH may be sent based on a same PDCCH configuration. When the first network device and the second network device are the different network devices, the first PDCCH and the second PDCCH may be separately sent based on different PDCCH configurations.

In an embodiment, if the terminal device receives the first PDCCH and the second PDCCH based on a same PDCCH configuration, or in other words, the first network device and the second network device send the first PDCCH and the second PDCCH to the terminal device based on a same PDCCH configuration, the terminal device may determine that the first network device and the second network device are the same network device or the first network device and the second network device belong to the same network device group. The terminal device may further re-determine the first resource based on the first PDCCH and the second PDCCH.

If the terminal device receives the first PDCCH based on a PDCCH configuration, and receives the second PDCCH based on another PDCCH configuration, or in other words, the first network device sends the first PDCCH to the terminal device based on a PDCCH configuration, and the second network device sends the second PDCCH to the terminal device based on another PDCCH configuration, the terminal device may determine that the first network device and the second network device are the different network devices or the first network device and the second network device belong to the different network device groups. The terminal device may directly receive the first data on the first PDSCH scheduled by using the first PDCCH.

The terminal device does not expect that resources of PDSCHs scheduled by using two PDCCHs sent based on a same PDCCH configuration overlap. In other words, when the PDCCH configuration corresponding to the first PDCCH is the same as the PDCCH configuration corresponding to the second PDCCH, the terminal device does not expect that the resource of the first PDSCH scheduled by using the first PDCCH overlaps the resource of the second PDSCH scheduled by using the second PDCCH.

Optionally, the first network device and the second network device belong to a same cell. That is, two or more PDCCH configurations may be configured for a same cell, and each PDCCH configuration may correspond to one network device.

It should be understood that the first network device and the second network device may alternatively be two network devices in different cells. The foregoing example is merely an example, and shall not constitute any limitation on this application.

In addition, a correspondence between a network device and a PDCCH configuration may be determined through negotiation in advance. For example, network devices may negotiate and configure the correspondence between a network device and a PDCCH configuration by using a backhaul link. The correspondence between a network device and a PDCCH configuration and a configuration manner of the correspondence are not limited in this application.

Optionally, when a control resource set of the first PDCCH and a control resource set of the second PDCCH belong to a same control resource set, the terminal device determines that the first PDCCH and the second PDCCH meet the preset condition.

In other words, when the first PDCCH and the second PDCCH meet the preset condition, the control resource set of the first PDCCH is the same as the control resource set of the second PDCCH.

As described above, a control resource set may be used to determine a search space of a PDCCH. For the terminal device, a control resource set of a PDCCH may be understood as a control resource set based on which the PDCCH is received. In other words, the terminal device may blindly detect the PDCCH in a search space determined by using the control resource set. For the network device, a control resource set of a PDCCH may be understood as a control resource set based on which the PDCCH is sent. In other words, the network device may send the PDCCH on some resources in a search space determined by using the control resource set.

When the terminal device determines that a search space in which the first PDCCH is blindly detected and a search space in which the second PDCCH is blindly detected are based on a same control resource set, it may be considered that the control resource set of the first PDCCH is the same as the control resource set of the second PDCCH.

In an embodiment, if the terminal device receives the first PDCCH and the second PDCCH based on a same control resource set in a same PDCCH configuration, or in other words, the first network device and the second network device separately send the first PDCCH and the second PDCCH based on a same control resource set in a same PDCCH configuration, the terminal device may determine that the first network device and the second network device are the same network device or the first network device and the second network device belong to the same network device group. The terminal device may further re-determine the first resource based on the first PDCCH and the second PDCCH.

If the terminal device receives the first PDCCH based on a control resource set, and receives the second PDCCH based on another control resource set, or in other words, the first network device sends the first PDCCH to the terminal device based on a control resource set, and the second network device sends the second PDCCH to the terminal device based on another control resource set, the terminal device may determine that the first network device and the second network device are the different network devices or the first network device and the second network device belong to the different network device groups. The terminal device may directly receive the first data on the first PDSCH scheduled by using the first PDCCH.

Optionally, the first network device and the second network device belong to a same cell. That is, two or more control resource sets may be configured for a same cell, and each control resource set may correspond to one network device.

It should be understood that the first network device and the second network device may alternatively be two network devices in different cells. The foregoing example is merely an example, and shall not constitute any limitation on this application.

In addition, a correspondence between a network device and a control resource set may be determined through negotiation in advance. For example, network devices may negotiate and configure the correspondence between a network device and a control resource set by using a backhaul link. A correspondence between a network device and a control resource set and a configuration manner of the correspondence are not limited in this application.

Optionally, when a control resource set of the first PDCCH and a control resource set of the second PDCCH belong to a same control resource set group, the terminal device determines that the first PDCCH and the second PDCCH meet the preset condition.

In other words, when the first PDCCH and the second PDCCH meet the preset condition, the control resource set of the first PDCCH and the control resource set of the second PDCCH belong to a same resource set group.

Each network device may correspond to one or more control resource sets. In other words, each network device may send a PDCCH based on the one or more control resource sets corresponding to the network device. One or more control resource sets corresponding to a same network device may be defined as a control resource set group. That is, each network device may correspond to one control resource set group. When the terminal device determines that a control resource set that a search space in which the first PDCCH is blindly detected is based on and a control resource set that a search space in which the second PDCCH is blindly detected is based on belong to a same control resource set group, it may be considered that the control resource set of the first PDCCH and the control resource set of the second PDCCH belong to the same control resource set group.

In an embodiment, if the terminal device receives the first PDCCH and the second PDCCH based on control resource sets in a same control resource set group, or in other words, a control resource set based on which the first network device sends the first PDCCH and a control resource set based on which the second network device sends the second PDCCH belong to a same control resource set group, the terminal device may determine that the first network device and the second network device are the same network device, or the first network device and the second network device belong to the same network device group. The terminal device may further re-determine the first resource based on the first PDCCH and the second PDCCH.

If the terminal device receives the first PDCCH based on a control resource set in a control resource set group, and receives the second PDCCH based on a control resource set in another control resource set group, or in other words, the first network device sends the first PDCCH based on a control resource set in a control resource set group, and the second network device sends the second PDCCH based on a control resource set in another control resource set group, the terminal device may determine that the first network device and the second network device are the different network devices, or the first network device and the second network device belong to the different network device groups. The terminal device may directly receive the first data on the first PDSCH scheduled by using the first PDCCH.

Optionally, the first network device and the second network device belong to a same cell. That is, two or more control resource set groups may be configured for a same cell, and each control resource set group may correspond to one network device.

It should be understood that the first network device and the second network device may alternatively be two network devices in different cells. The foregoing example is merely an example, and shall not constitute any limitation on this application.

In addition, a correspondence between a network device and a control resource set group may be determined through negotiation in advance. For example, network devices may negotiate and configure the correspondence between a network device and a control resource set group by using a backhaul link. A correspondence between a network device and a control resource set group and a configuration manner of the correspondence are not limited in this application.

Optionally, when a search space set of the first PDCCH and a search space set of the second PDCCH belong to a same search space set, the terminal device determines that the first PDCCH and the second PDCCH meet the preset condition.

In other words, when the first PDCCH and the second PDCCH meet the preset condition, the search space set of the first PDCCH is the same as the search space set of the second PDCCH.

As described above, a search space set may be a set of search spaces. One search space set may include one or more search spaces. For the terminal device, a search space set of a PDCCH may be understood as a search space set based on which the PDCCH is received. In other words, the terminal device may blindly detect the PDCCH in a search space included in the search space set. For the network device, a search space set of a PDCCH may be understood as a search space set based on which the PDCCH is sent. In other words, the network device may send the PDCCH in a search space included in the search space set.

When the terminal device determines that a search space set in which the first PDCCH is blindly detected and a search space set in which the second PDCCH is blindly detected are a same search space set, it may be considered that the search space set of the first PDCCH is the same as the search space set of the second PDCCH.

The foregoing has described in detail, with reference to the control resource set, a specific method for determining, by the terminal device, whether the first PDCCH and the second PDCCH meet the preset condition. A specific method for determining, by the terminal device based on the search space set, whether the first PDCCH and the second PDCCH meet the preset condition is similar to the foregoing method. For brevity, details are not described herein again.

In addition, a correspondence between a network device and a search space set may be determined through negotiation in advance. For example, network devices may negotiate and configure the correspondence between a network device and a search space set by using a backhaul link. A correspondence between a network device and a search space set and a configuration manner of the correspondence are not limited in this application.

Optionally, when a search space set of the first PDCCH and a search space set of the second PDCCH belong to a same search space set group, the terminal device determines that the first PDCCH and the second PDCCH meet the preset condition.

In other words, when the first PDCCH and the second PDCCH meet the preset condition, the search space set of the first PDCCH and the search space set of the second PDCCH belong to the same search space set group.

Each network device may correspond to one or more search space sets. In other words, each network device may send a PDCCH based on the one or more search space sets corresponding to the network device. One or more search space sets corresponding to a same network device may be defined as a search space set group. That is, each network device may correspond to one search space set group.

When the terminal device determines that a search space set to which a search space in which the first PDCCH is blindly detected belongs and a search space set to which a search space in which second PDCCH is blindly detected belongs belong to a same search space set group, it may be considered that the search space set of the first PDCCH and the search space set of the second PDCCH belong to the same search space set group.

The foregoing has described in detail, with reference to the control resource set group, a specific method for determining, by the terminal device, whether the first PDCCH and the second PDCCH meet the preset condition. A specific method for determining, by the terminal device based on the search space set group, whether the first PDCCH and the second PDCCH meet the preset condition is similar to the foregoing method. For brevity, details are not described herein again.

In addition, a correspondence between a network device and a search space set group may be determined through negotiation in advance. For example, network devices may negotiate and configure the correspondence between a network device and a search space set group by using a backhaul link. A correspondence between a network device and a search space set group and a configuration manner of the correspondence are not limited in this application.

Optionally, when a DMRS port indicated on the first PDCCH and a DMRS port indicated on the second PDCCH belong to a same DMRS port group, the terminal device determines that the first PDCCH and the second PDCCH meet the preset condition.

In other words, when a DMRS port of the first PDSCH scheduled by using the first PDCCH and a DMRS port of the second PDSCH scheduled by using the second PDCCH belong to a same DMRS port group, the terminal device may determine that the first PDCCH and the second PDCCH meet the preset condition.

When two or more network devices serve a same terminal device, if the two or more network devices use a same port, mutual interference may be caused; if the two or more network devices use ports in a same port group, channel estimation of the terminal device may be inaccurate, and signal receiving quality deteriorates. To avoid different network devices using a same port to serve a same terminal device, usually, the different network devices or different network device groups may be limited to use ports in different port groups to serve the same terminal device. It should be understood that each network device is not limited to using one port group.

Ports in different port groups are completely different. In other words, ports in different port groups are not repeated. Ports included in each port group may be predefined, for example, defined in a protocol, or may be indicated by the network device, for example, the network device may notify the terminal device of the ports in each port group by using higher layer signaling.

The network device may indicate, on a PDCCH, a DMRS port of a scheduled PDSCH. The terminal device may determine, based on the received first PDCCH, a port of a DMRS used to demodulate the first PDSCH, and may determine, based on the received second PDCCH, a port of a DMRS used to demodulate the second PDSCH.

If the terminal device determines that the DMRS port indicated by the first PDCCH and the DMRS port indicated by the second PDCCH belong to the same DMRS port group, the terminal device may determine that the first network device and the second network device are the same network device or the first network device and the second network device are from the same network device group. The terminal device may further re-determine the first resource based on the first PDCCH and the second PDCCH.

If the terminal device determines that the DMRS port indicated by the first PDCCH and the DMRS port indicated by the second PDCCH belong to different DMRS port groups, the terminal device may determine that the first network device and the second network device are the different network devices or the first network device and the second network device belong to the different network device groups. The terminal device may directly receive the first data on the first PDSCH scheduled by using the first PDCCH.

Optionally, when the first PDCCH and the second PDCCH are from a same cell, the terminal device determines that the first PDCCH and the second PDCCH meet the preset condition.

In other words, when the first PDCCH and the second PDCCH meet the preset condition, the first PDCCH and the second PDCCH may be from the same cell, or in other words, the first network device that sends the first PDCCH and the second network device that sends the second PDCCH may be from the same cell.

In an NR protocol, a serving cell configuration (serving cell configuration) may be used to configure a serving cell for the terminal device. The serving cell configuration may include a group of bandwidth part downlink dedicated parameters (BWP downlink dedicated, BWP DL Dedicated). The BWP downlink dedicated parameters may include a PDCCH configuration. In other words, one cell may correspond to one PDCCH configuration.

When receiving the first PDCCH and the second PDCCH, the terminal device may determine, depending on whether PDCCH configurations based on which the first PDCCH and the second PDCCH are received are the same, whether the first network device and the second network device are from a same cell. There may be an ideal backhaul between two network devices in a same cell. Therefore, if the terminal device determines that the first PDCCH and the second PDCCH are from the same cell, the terminal device may determine that the first network device and the second network device are the same network device or the first network device and the second network device belong to the same network device group. The terminal device may further re-determine the first resource based on the first PDCCH and the second PDCCH.

On the contrary, if the terminal device determines that the first PDCCH and the second PDCCH are from different cells, the terminal device may determine that the first network device and the second network device are the different network devices or the first network device and the second network device belong to the different network device groups. The terminal device may directly receive the first data on the first PDSCH scheduled by using the first PDCCH. Optionally, when the first PDCCH and the second PDCCH are from a same cell group, the terminal device determines that the first PDCCH and the second PDCCH meet the preset condition.

One cell group may include one or more cells. There may be an ideal backhaul link between network devices in a same cell group. Therefore, when receiving the first PDCCH and the second PDCCH, the terminal device may determine, based on PDCCH configurations based on which the PDCCHs are received, cells from which the PDCCHs are from, and may further determine whether a cell that the first PDCCH is from and a cell that the second PDCCH is from belong to a same cell group.

If the terminal device determines that the first PDCCH and the second PDCCH are from the same cell group, the terminal device may determine that the first network device and the second network device are the same network device or the first network device and the second network device belong to the same network device group. The terminal device may further re-determine the first resource based on the first PDCCH and the second PDCCH.

If the terminal device determines that the first PDCCH and the second PDCCH are from different cell groups, the terminal device may determine that the first network device and the second network device are the different network devices or the first network device and the second network device belong to the different network device groups. The terminal device may directly receive the first data on the first PDSCH scheduled by using the first PDCCH. Optionally, when both the first PDCCH and the second PDCCH are primary PDCCHs, the terminal device determines that the first PDCCH and the second PDCCH meet the preset condition.

Based on different content included in DCI, the DCI may be classified into primary DCI and secondary DCI. A PDCCH that corresponds to the primary DCI and that is used to transmit the primary DCI may be referred to as a primary PDCCH. A PDCCH that corresponds to the secondary DCI and that is used to transmit the secondary DCI may be referred to as a secondary PDCCH.

Information included in the secondary DCI may be a subset of information included in the primary DCI. In other words, the secondary DCI includes only some indicator fields included in the primary DCI. That is, the primary DCI includes more indication information than the secondary DCI. Alternatively, the primary DCI and the secondary DCI may include different information. For example, the master DCI may be DCI including one or more specific parameters. The specific parameter may include, for example, at least one of the following: a carrier indicator (carrier indicator), a bandwidth part indicator (bandwidth part indicator), a rate matching indicator (rate matching indicator), and a zero power channel state information reference signal trigger (zero power channel state information reference signal trigger, ZP CSI-RS trigger). Correspondingly, the secondary DCI may be DCI that does not include any one of the foregoing specific parameters. The secondary DCI may include at least one piece of the following DCI: resource allocation (resource allocation), a modulation and coding scheme (modulation coding scheme, MCS), a redundancy version (redundancy version, RV), a new data indicator (new data indicator, NDI), and a hybrid automatic repeat request (hybrid automatic repeat request, HARQ) process identifier (HARQ process ID).

Specific content included in the primary DCI and the secondary DCI may be predefined in a protocol. When content included in a PDCCH blindly detected by the terminal device belongs to a scope of the content included in the primary DCI, it may be considered that the PDCCH is a primary PDCCH.

In an implementation, an urgent service is sent by using a primary eNodeB, that is, scheduled by using a primary PDCCH, and is transmitted by using a PDSCH scheduled by using the primary PDCCH. Therefore, when both the first PDCCH and the second PDCCH that are received by the terminal device are primary PDCCHs, it may be determined that the first PDCCH and the second PDCCH are from a same network device or a same network device group. In addition, the second PDCCH is used for scheduling the urgent service.

Optionally, when a receive beam of the first PDSCH scheduled by using the first PDCCH and a receive beam of the second PDSCH scheduled by using the second PDCCH belong to a same receive beam group, the terminal device determines that the first PDCCH and the second PDCCH meet the preset condition.

In this embodiment, receive beams of the terminal device may be grouped, and a PDCCH and a PDSCH from a same network device or a same network device group are received by using receive beams in a same receive beam group.

As described above, the network device may use DCI to carry a TCI, and indicate a selected TCI state by using the TCI. Each TCI state may include a reference signal resource identifier used to determine a receive beam used to receive a PDSCH. In other words, there is a correspondence between the reference signal resource identifier and the receive beam. Therefore, in an implementation, receive beam grouping may also be implemented by grouping reference signal resources.

Specifically, the network device may indicate a plurality of reference signal resource groups by using signaling, and each reference signal resource group includes one or more reference signal resources. The terminal device may determine a receive beam based on a reference signal resource identifier indicated in a TCI state, and receive a PDCCH from the network device by using the receive beam corresponding to the reference signal resource. When a receive beam used by the terminal device to receive the first PDCCH and a receive beam used by the terminal device to receive the second PDCCH belong to a same receive beam group, a reference signal resource included in a TCI state indicated by a TCI in the first DCI transmitted on the first PDCCH and a reference signal resource included in a TCI state indicated by a TCI in the second DCI transmitted on the second PDCCH also belong to a same reference signal resource group. In this case, it may be considered that the first network device and the second network device are the same network device or the first network device and the second network device belong to the same network device group. When a receive beam used by the terminal device to receive the first PDCCH and a receive beam used by the terminal device to receive the second PDCCH belong to different receive beam groups, a reference signal resource included in a TCI state indicated by a TCI in the first DCI and a reference signal resource included in a TCI state indicated by a TCI in the second DCI belong to different reference signal resource groups. In this case, it may be considered that the first network device and the second network device are the different network devices or the first network device and the second network device belong to the different network device groups.

Usually, receive beams in a same receive beam group may be configured on a same antenna panel (panel). Therefore, in another implementation, an indication field may be added to an existing TCI state, to distinguish between different receive beam groups.

For example, an indication field related to an antenna panel may be added to the TCI state. For example, "panel 1" represents an antenna panel 1, and "panel 2" represents an antenna panel 2. The network device may indicate an available TCI state by using a TCI, to further indicate an antenna panel used by the terminal device to receive a PDSCH. When an antenna panel indicated by the TCI state indicated by the TCI in the first TCI and an antenna panel indicated by the TCI state indicated by the TCI in the second DCI are a same antenna panel, it may be considered that the first network device and the second network device are the same network device. When an antenna panel indicated by the TCI state indicated by the TCI in the first TCI and an antenna panel indicated by the TCI state indicated by the TCI in the second DCI are different antenna panels, it may be considered that the first network device and the second network device are the different network devices.

It should be understood that the indication field related to the antenna panel is not limited to the foregoing example. The indication field related to the antenna panel is not limited in this application. It should be further understood that, that different receive beam groups are distinguished by using reference signal resources and antenna panels, to determine whether the first PDCCH and the second PDCCH are from the same network device or the same network device group is merely a possible implementation used to determine whether the first network device and the second network device are the same network device or belong to the same network device group, and shall not constitute any limitation on this application. In this application, a possibility of distinguishing between the different receive beam groups in another manner is not excluded.

It should be understood that "a receive beam of the first PDSCH scheduled by using the first PDCCH and a receive beam of the second PDSCH scheduled by using the second PDCCH belong to a same receive beam group" may be considered equivalent to "a transmit beam of the first PDSCH and a transmit beam of the second PDSCH belong to a same transmit beam group". Because there is a relationship between the reference signal resource identifier and the receive beam, and there is also a correspondence between the reference signal resource identifier and a transmit beam, the corresponding receive beam and transmit beam may also be determined when the reference signal resource identifier is determined. When reference signal resources indicated by reference signal resource identifiers indicated in TCIs belong to a same reference signal resource group, it may be considered that corresponding transmit beams also belong to a same transmit beam group. When receive beams corresponding to reference signal resource identifiers indicated in TCIs belong to a same receive beam group, it may be considered that transmit beams corresponding to the reference signal resource identifiers indicated in the TCIs also belong to a same transmit beam group.

Optionally, when a receive beam of the first PDCCH and a receive beam of the second PDCCH belong to a same receive beam group, the terminal device determines that the first PDCCH and the second PDCCH meet the preset condition.

The foregoing has described in detail the receive beam group and a method for determining whether receive beams belong to a same receive beam group. For brevity, details are not described herein again.

When sending the PDCCH, the network device may activate a TCI state by using a media access control (media access control, MAC) control element (control element, CE). The TCI state may include a reference signal resource identifier used to determine a receive beam used to receive the PDCCH.

The terminal device may determine, based on the TCI state activated by using the MAC CE, the receive beam used to receive the PDCCH.

When the receive beams of the first PDCCH and the second PDCCH belong to the same receive beam group, it may be considered that the first network device and the second network device are the same network device or the first network device and the second network device belong to the same network device group.

It should be understood that "a receive beam of the first PDCCH and a receive beam of the second PDCCH belong to a same receive beam group" may be considered equivalent to "a transmit beam of the first PDCCH and a transmit beam of the second PDCCH belong to a same transmit beam group". The foregoing has described in detail the correspondence between a transmit beam group and a receive beam group. For brevity, details are not described herein again.

Optionally, when a PDSCH configuration of the first PDSCH scheduled by using the first PDCCH is the same as a PDSCH configuration of the second PDSCH scheduled by using the second PDCCH, the terminal device determines that the first PDCCH and the second PDCCH meet the preset condition.

When scheduling a PDSCH by using DCI, the network device may indicate, in the DCI, a PDSCH configuration of the scheduled PDSCH. The terminal device may determine the PDSCH configuration of the first PDSCH based on the first PDCCH, and may determine the PDSCH configuration of the second PDSCH based on the second PDCCH. If the PDSCH configuration of the first PDSCH is the same as the PDSCH configuration of the second PDSCH, it may be considered that the first PDCCH and the second PDCCH meet the preset condition. The terminal device may redetermine the first resource based on the first PDCCH and the second PDCCH. If the PDSCH configuration of the first PDSCH is different from the PDSCH configuration of the second PDSCH, the terminal device may determine that the first PDCCH and the second PDCCH do not meet the preset condition. The terminal device directly receives the first data on the first PDSCH scheduled by using the first PDCCH.

The foregoing lists a plurality of implementations used to determine whether the first PDCCH and the second PDCCH meet the preset condition. However, it should be understood that this should not constitute any limitation on this application. For example, the preset condition is not limited to the foregoing listed examples. For example, two or more of the foregoing listed examples may be used in combination, for example, the PDCCH configuration of the first PDCCH is the same as the PDCCH configuration of the second PDCCH and the receive beam of the first PDSCH scheduled by using the first PDCCH and the receive beam of the second PDSCH scheduled by using the second PDCCH belong to the same receive beam group. For brevity, examples are listed one by one herein. The preset condition may further include another condition. A person skilled in the art may obtain more possible conditions by replacing or transforming the foregoing listed conditions based on a same concept. All these conditions shall fall within the protection scope of this application.

After determining that the first PDCCH and the second PDCCH meet the preset condition, the terminal device may determine the first resource based on the first PDCCH and the second PDCCH in step 240.

After receiving the first PDCCH and the second PDCCH, the terminal device cannot determine which PDCCH is the first PDCCH and which PDCCH is the second PDCCH. In this embodiment, the terminal device may determine the first PDCCH and the second PDCCH according to a preset rule, to further determine the first resource.

Optionally, the first PDCCH is located before the second PDCCH in time domain. In other words, a start symbol of the first PDCCH is earlier than a start symbol of the second PDCCH.

In other words, the terminal device may determine, based on a time sequence of receiving the PDCCHs, which PDCCH is the first PDCCH and which PDCCH is the second PDCCH, and then determine the first resource based on the first PDCCH and the second PDCCH.

That the first PDCCH is located before the second PDCCH in time domain may mean that the terminal device receives the first PDCCH before the second PDCCH.

Optionally, a mapping type of a time domain resource location of the first PDSCH is a type A. A mapping type of a time domain resource location of the second PDSCH is a type B.

When scheduling a PDSCH, the network device may indicate a mapping type of a time domain resource location of the scheduled PDSCH by using DCI on a PDCCH. In an NR protocol, the mapping type may include the type A and the type B. In some implementations, the type A is applicable to a service having a relatively low requirement on reliability and a latency, for example, is applicable to the foregoing non-urgent service such as an eMBB service. The type B is applicable to a service having a relatively high requirement on reliability and a latency, for example, is applicable to the foregoing urgent service such as a URLLC service. For specific content of the type A and the type B, refer to the conventional technology. For example, refer to related descriptions in NR protocols TS38.211 and TS38.214. For brevity, detailed descriptions of specific mapping manners of the type A and the type B are omitted herein.

In this embodiment, optionally, the first PDSCH is used to transmit the first data, the second PDSCH is used to transmit the second data. In addition, the first data may be data of a non-urgent service, and the second data may be data of an urgent service.

The terminal device may determine, based on mapping types, indicated on the received PDCCHs, of time domain resource locations of PDSCHs, which PDCCH is the first PDCCH used to schedule and transmit the first data and which PDCCH is the second PDCCH used to schedule and transmit the second data, and further determine the first resource based on the first PDCCH and the second PDCCH.

Optionally, a start symbol of a downlink DMRS of the first PDSCH is a second symbol or a third symbol in a slot in which the first PDSCH is located. A start symbol of a downlink DMRS of the second PDSCH scheduled by using the second PDCCH is an initial symbol of the second PDSCH.

A mapping location of a downlink DMRS in time domain is related to a mapping type of a time domain resource location of a PDSCH. For example, when the mapping type of the time domain resource location of the PDSCH is a type A, a start symbol of the downlink DMRS may be a second symbol or a third symbol in a slot in which the PDSCH is located. When the mapping type of the time domain resource location of the PDSCH is a type B, a start symbol of the downlink DMRS may be an initial symbol of the PDSCH.

Therefore, the terminal device may determine, based on time-domain locations, indicated on the PDCCHs, of DMRSs, mapping types of time domain resource locations of PDSCHs scheduled by using the received PDCCHs, and may further determine which PDCCH is the first PDCCH used to schedule and transmit the first data and which PDCCH is the second PDCCH used to schedule and transmit the second data, thereby determining the first resource based on the first PDCCH and the second PDCCH.

Based on the foregoing listed rules, the terminal device may determine the first PDCCH and the second PDCCH, and further determine the first resource based on the first PDCCH and the second PDCCH.

It should be understood that the method for determining, by the terminal device, the first PDCCH and the second PDCCH is not limited to the foregoing description. For brevity, examples are not listed one by one in this application. Based on a same concept, a person skilled in the art may figure out more possible implementations.

Therefore, in this embodiment of this application, the first resource used to transmit the first data is determined based on the first PDCCH and the second PDCCH. When the resource of the first PDSCH scheduled by using the first PDCCH overlaps the resource of the second PDCCH or the resource of second PDSCH scheduled by using the second PDCCH, the second PDCCH is preferentially received, and the second data transmitted on the second PDSCH may be preferentially received when a priority of the second data is relatively high based on a priority of a service type, to ensure reliable transmission of the second data.

Relatively, if the resource of the first PDSCH overlaps the resource of the second PDCCH, when the terminal device receives the first PDSCH and the second PDCCH, the first PDSCH and the second PDCCH may interfere with each other. Consequently, receiving quality deteriorates, and even decoding may fail. If the resource of the first PDSCH overlaps the resource of the second PDSCH, based on a same reason, receiving quality of the first PDSCH and the second PDSCH decrease, and even decoding may fail consequently. Therefore, data transmission performance deteriorates.

Even if the network device does not send the first PDSCH on a resource overlapping the second PDSCH and/or the second PDCCH, to ensure performance of an urgent service on the second PDSCH, the terminal device may still receive data on the first PDSCH because the terminal device does not know in advance. Consequently, the terminal device still cannot successfully obtain the first PDSCH and the second PDSCH.

However, in this embodiment of this application, the terminal device may determine, based on the first PDCCH and the second PDCCH, the first resource used to transmit the first data, to remove, from the first PDSCH, the resource overlapping the second PDCCH and/or the second PDSCH, so that a problem of data transmission quality deterioration caused by mutual interference can be avoided, and this ensures reliability of urgent data, and helps improve data transmission performance.

In addition, the terminal device may further determine, based on a preset condition, whether the first PDSCH and the second PDSCH can be received simultaneously, to fully use a resource. For example, different data may be transmitted in a manner such as spatial multiplexing. This helps improve resource utilization and system performance.

It should be understood that, merely for ease of understanding, the foregoing uses the first PDCCH, the second PDCCH, the first PDSCH scheduled by using the first PDCCH, and the second PDSCH scheduled by using the second PDCCH as an example to describe in detail the data sending and receiving method. However, this shall not constitute any limitation on this application. The terminal device may receive more PDCCHs and PDSCHs. When receiving scheduling of a plurality of PDCCHs, the terminal device may still determine a resource and receive data based on the foregoing method. A quantity of PDCCHs received by the terminal device and a quantity of PDSCHs received by the terminal device are not limited in this application, and a quantity of network devices serving the terminal device is not limited in this application either.

The method provided in the embodiments of this application is described above in detail with reference to FIG. 2 to FIG. 5. Communication apparatuses provided in the embodiments of this application are described below in detail with reference to FIG. 6 to FIG. 8.

Figure 6:
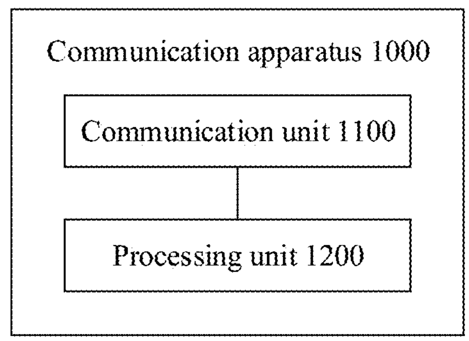
FIG. 6 is a schematic block diagram of a communication apparatus according to an embodiment of this application.

FIG. 6 is a schematic block diagram of a communication apparatus according to an embodiment of this application. As shown in the figure, the communication apparatus 1000 may include a communication unit 1100 and a processing unit 1200.

In a possible design, the communication apparatus 1000 may correspond to the terminal device in the foregoing method embodiment. For example, the communication apparatus 1000 may be a terminal device or a chip disposed in a terminal device.

Specifically, the communication apparatus 1000 may correspond to the terminal device in the method 200 according to the embodiments of this application. The communication apparatus 1000 may include units configured to perform the method performed by the terminal device in the method 200 in FIG. 2. In addition, the units in the communication apparatus 1000 and the foregoing other operations and/or functions are separately used to implement corresponding procedures of the method 200 in FIG. 2.

When the communication apparatus 1000 is configured to perform the method 200 in FIG. 2, the communication unit 1100 may be configured to perform step 210, step 220, step 250, and step 260 in the method 200, and the processing unit 1200 may be configured to perform step 230 in the method 200.

It should be understood that a specific process in which the units perform the foregoing corresponding steps has been described in detail in the foregoing method embodiment. For brevity, details are not described herein again.

Figure 7:
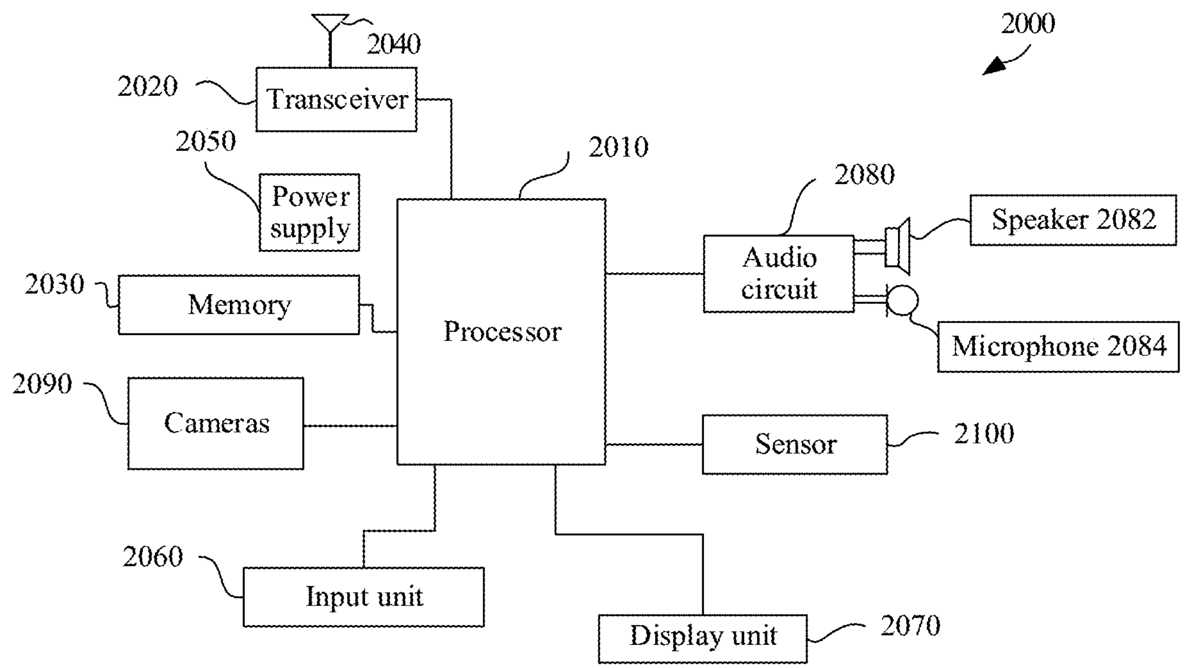
FIG. 7 is a schematic structural diagram of a terminal device according to an embodiment of this application.

It should be further understood that when the communication apparatus 1000 is the terminal device, the communication unit 1100 in the communication apparatus 1000 may correspond to a transceiver 2020 in a terminal device 2000 shown in FIG. 7, and the processing unit 1200 in the communication apparatus 1000 may correspond to a processor 2010 in the terminal device 2000 shown in FIG. 7.

It should be further understood that when the communication apparatus 1000 is the chip disposed in the terminal device, the communication unit 1100 in the communication apparatus 1000 may be an input/output interface.

In another possible design, the communication apparatus 1000 may correspond to the network device in the foregoing method embodiment. For example, the communication apparatus 1000 may be a network device or a chip disposed in a network device.

In another possible design, the communication apparatus 500 may correspond to the network device in the foregoing method embodiment. For example, the communication apparatus 500 may be a network device or a chip disposed in a network device.

Specifically, the communication apparatus 1000 may correspond to the first network device in the method 200 according to the embodiments of this application. The communication apparatus 1000 may include units configured to perform the method performed by the network device in the method 200 in FIG. 2. In addition, the units in the communication apparatus 1000 and the foregoing other operations and/or functions are separately used to implement corresponding procedures of the method 200 in FIG. 2.

When the communication apparatus 1000 is configured to perform the method 200 in FIG. 2, the communication unit 1100 may be configured to perform step 210 and step 250 in the method 200, or may be configured to perform step 210, step 220, step 240, and step 250 in the method 200, and the processing unit 1200 may be configured to perform step 240 in the method 200.

It should be understood that a specific process in which the units perform the foregoing corresponding steps has been described in detail in the foregoing method embodiment. For brevity, details are not described herein again.

Figure 8:
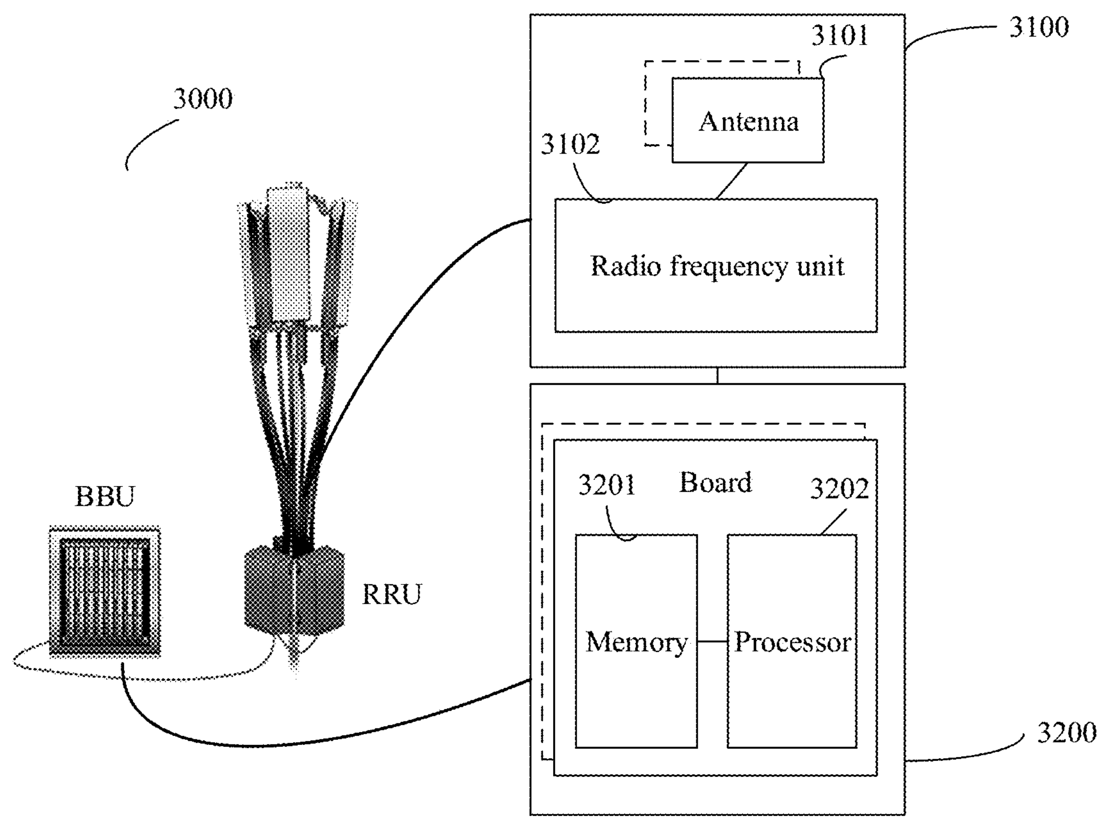
FIG. 8 is a schematic structural diagram of a network device according to an embodiment of this application.

It should be further understood that when the communication apparatus 1000 is the network device, the communication unit in the communication apparatus 1000 may correspond to a transceiver 3200 in a network device 3000 shown in FIG. 8, and the processing unit 1200 in the communication apparatus 1000 may correspond to a processor 3100 in the network device 3000 shown in FIG. 8.

It should be further understood that when the communication apparatus 1000 is the chip disposed in the network device, the communication unit 1100 in the communication apparatus 1000 may be an input/output interface.

FIG. 7 is a schematic structural diagram of the terminal device 2000 according to an embodiment of this application. The terminal device 2000 may be used in the system shown in FIG. 1, to perform functions of the terminal device in the foregoing method embodiment.

As shown in the figure, the terminal device 2000 includes the processor 2010 and the transceiver 2020. Optionally, the terminal device 2000 further includes a memory 2030. The processor 2010, the transceiver 2002, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send or receive a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030, to implement the foregoing functions. During specific implementation, the memory 2030 may also be integrated into the processor 2010, or may be independent of the processor 2010. The processor 2010 may correspond to the processing unit in FIG. 6.

The transceiver 2020 may correspond to the communication unit in FIG. 6, and may also be referred to as a transceiver unit. The transceiver 2020 may include a receiver (or referred to as a receiver or a receiving circuit) and a transmitter (or referred to as a transmitter or a transmitting circuit). The receiver is configured to receive a signal, and the transmitter is configured to transmit a signal.

It should be understood that, the terminal device 2000 shown in FIG. 7 can implement the processes related to the terminal device in the method embodiment shown in FIG. 2. The operations and/or the functions of the modules in the terminal device 2000 are separately used to implement corresponding procedures in the foregoing method embodiment. For details, refer to the descriptions in the foregoing method embodiment. To avoid repetition, detailed descriptions are properly omitted herein.

The processor 2010 may be configured to perform an action implemented inside the terminal device in the foregoing method embodiment, and the transceiver 2020 may be configured to perform an action of sending by the terminal device to the network device or receiving from the network device in the foregoing method embodiment. For details, refer to the descriptions in the foregoing method embodiment. Details are not described herein again.

Optionally, the terminal device 2000 may further include a power supply 2050 configured to supply power to various devices or circuits in the terminal device.

In addition, to improve functions of the terminal device, the terminal device 2000 may further include one or more of an input unit 2060, a display unit 2070, an audio circuit 2080, a camera 2090, a sensor 2100, and the like, and the audio circuit may further include a loudspeaker 2082, a microphone 2084, and the like.

FIG. 8 is a schematic structural diagram of the network device according to an embodiment of this application. For example, FIG. 8 may be a schematic structural diagram of a base station. The base station 3000 may be used in the system shown in FIG. 1, to perform functions of the network device in the foregoing method embodiment.

As shown in the figure, the base station 3000 may include one or more radio frequency units such as remote radio units (remote radio unit, RRU) 3100 and one or more baseband units (baseband unit, BBU) (which may also be referred to as digital units, digital unit, DU) 3200. The RRU 3100 may be referred to as a transceiver unit, and corresponds to the communication unit 1200 in FIG. 6. Optionally, the transceiver unit 3100 may also be referred to as a transceiver, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver or a receiving circuit), and the sending unit may correspond to a transmitter (or referred to as a transmitter or a transmitting circuit). The RRU 3100 is mainly configured to send and receive a radio frequency signal, and perform conversion between the radio frequency signal and a baseband signal. For example, the RRU 3100 is configured to send indication information to a terminal device. The BBU 3200 is mainly configured to: perform baseband processing, control the base station, and the like. The RRU 3100 and the BBU 3200 may be physically disposed together, or may be physically disposed separately; to be specific, the base station is a distributed base station.

The BBU 3200 is a control center of the base station, or may be referred to as a processing unit. The BBU 3200 may correspond to the processing unit 1100 in FIG. 6, and is mainly configured to implement a baseband processing function, for example, channel coding, multiplexing, modulation, or spreading. For example, the BBU (the processing unit) may be configured to control the base station to perform an operation procedure related to the network device in the foregoing method embodiment, for example, to generate the foregoing indication information.

In an example, the BBU 3200 may include one or more boards, and a plurality of boards may jointly support a radio access network (such as an LTE network) having a single access standard, or may separately support radio access networks (such as an LTE network, a 5G network, or another network) having different access standards. The BBU 3200 further includes a memory 3201 and a processor 3202. The memory 3201 is configured to store necessary instructions and necessary data. The processor 3202 is configured to control the base station to perform a necessary action, for example, configured to control the base station to perform the operation procedure related to the network device in the foregoing method embodiment. The memory 3201 and the processor 3202 may serve one or more boards. In other words, a memory and a processor may be disposed on each board. Alternatively, a plurality of boards may share a same memory and a same processor. In addition, a necessary circuit may further be disposed on each board.

It should be understood that the base station 3000 shown in FIG. 8 can implement processes related to the network device in the method embodiment in FIG. 2. The operations and/or the functions of the modules in the base station 3000 are separately used to implement corresponding procedures in the foregoing method embodiment. For details, refer to the descriptions in the foregoing method embodiment. To avoid repetition, detailed descriptions are properly omitted herein.

The BBU 3200 may be configured to perform an action implemented inside the network device in the foregoing method embodiment, and the RRU 3100 may be configured to perform an action of sending by the network device to the terminal device or receiving from the terminal device in the foregoing method embodiment. For details, refer to the descriptions in the foregoing method embodiment. Details are not described herein again.

An embodiment of this application further provides a processing apparatus, including a processor and an interface. The processor is configured to perform the communication method in the foregoing method embodiment.

It should be understood that, the processing apparatus may be a chip. For example, the processing apparatus may be a field programmable gate array (field programmable gate array, FPGA), an application specific integrated chip (application specific integrated circuit, ASIC), a system on chip (system on chip, SoC), a central processing unit (central processor unit, CPU), a network processor (network processor, NP), a digital signal processing circuit (digital signal processor, DSP), a microcontroller (micro controller unit, MCU), a programmable controller (programmable logic device, PLD), or another integrated chip.

In an implementation process, steps in the foregoing method can be completed by using a hardware integrated logical circuit in the processor, or by using instructions in a form of software. The steps of the method disclosed with reference to the embodiments of this application may be directly performed and accomplished by a hardware processor, or may be performed and accomplished by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing method in combination with hardware in the processor. To avoid repetition, details are not described herein again.

It should be noted that the processor in the embodiments of this application may be an integrated circuit chip, and has a signal processing capability. In an implementation process, steps in the foregoing method embodiment can be completed by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the method, the steps, and logical block diagrams that are disclosed in the embodiments of this application. The general purpose processor may be a microprocessor, or the processor may be any conventional processor or the like. Steps of the method disclosed with reference to the embodiments of this application may be directly performed and accomplished by using a hardware decoding processor, or may be performed and accomplished by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing method in combination with hardware in the processor.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and method described in this specification includes but is not limited to these and any memory of another proper type.

According to the method provided in the embodiments of this application, this application further provides a computer program product. The computer program product includes computer program code. When the computer program code is run on a computer, the computer is enabled to perform the method in any one of the embodiments shown in FIG. 2.

According to the method provided in the embodiments of this application, this application further provides a computer-readable medium. The computer-readable medium stores program code. When the program code is run on a computer, the computer is enabled to perform the method in any one of the embodiments shown in FIG. 2.

According to the method provided in the embodiments of this application, this application further provides a system, including the foregoing one or more terminal devices and one or more network devices.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD), a semiconductor medium (for example, a solid-state drive (solid state disc, SSD)), or the like.

The network device and the terminal device in the foregoing apparatus embodiments completely correspond to the network device and the terminal device in the method embodiment. A corresponding module or unit performs a corresponding step. For example, the communication unit (transceiver) performs a receiving or sending step in the method embodiment, and another step other than the sending step and the receiving step may be performed by the processing unit (processor). For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and according to, for example, a signal having one or more data packets (for example, data from two components interacting with another component in a local system, in a distributed system, and/or across a network such as the Internet interacting with other systems by using the signal).

A person of ordinary skill in the art may be aware that, in combination with illustrative logical blocks (illustrative logical block) described in the embodiments disclosed in this specification and steps (step) may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located at one location, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit.

In the foregoing embodiments, all or some of functions of the functional units may be implemented by software, hardware, firmware, or any combination thereof. When software is used to implement the embodiments, the embodiments may be implemented completely or partially in a form of a computer program product. The computer program product includes one or more computer instructions (programs). When the computer program instructions (programs) are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data receiving method, comprising:

receiving a first physical downlink control channel (PDCCH), wherein the first PDCCH is used to schedule a first physical downlink shared channel (PDSCH), and the first PDSCH is used to transmit first data;

receiving a second PDCCH;

determining, based on the first PDCCH and the second PDCCH, a first resource used to transmit the first data, wherein the first resource is a part or all of a resource of the first PDSCH; and receiving the first data on the first resource, wherein when a resource of the second PDCCH overlaps the resource of the first PDSCH, the determining, based on the first PDCCH and the second PDCCH, a first resource used to transmit the first data comprises:

determining, as the first resource, a resource other than the second PDCCH in the first PDSCH scheduled by using the first PDCCH by discarding a part of the resource overlapping the second PDCCH.

2. The method according to claim 1, wherein the second PDCCH is used to schedule a second PDSCH; and when a resource of the second PDSCH overlaps the resource of the first PDSCH, the determining, based on the first PDCCH and the second PDCCH, a first resource used to transmit the first data comprises:

determining, as the first resource, a resource other than the second PDSCH in the first PDSCH.

3. The method according to claim 1, wherein the second PDCCH is used to schedule a second PDSCH; and when both a resource of the second PDCCH and a resource of the second PDSCH overlap the resource of the first PDSCH, the determining, based on the first PDCCH and the second PDCCH, a first resource used to transmit the first data comprises:

determining, as the first resource, a resource other than the second PDCCH and the second PDSCH in the first PDSCH scheduled by using the first PDCCH.

4. The method according to claim 1, wherein the second PDCCH is used to schedule a second PDSCH; and when neither a resource of the second PDCCH nor a resource of the second PDSCH overlaps the resource of the first PDSCH, the determining, based on the first PDSCH and the second PDCCH, a first resource used to transmit the first data comprises:

determining, as the first resource, the first PDSCH scheduled by using the first PDCCH.

5. The method according to claim 1, wherein the determining, based on the first PDCCH and the second PDCCH, a first resource used to transmit the first data comprises:

when the first PDCCH and the second PDCCH meet a preset condition, determining, based on the first PDSCH and the second PDCCH, the first resource used to transmit the first data.

6. The method according to claim 1, wherein the determining, based on the first PDCCH and the second PDCCH, a first resource used to transmit the first data comprises:

when the first PDCCH and the second PDCCH do not meet a preset condition, determining, based on the first PDCCH, the first resource used to transmit the first data.

7. A data sending method, comprising:

sending a first physical downlink control channel (PDCCH), wherein the first PDCCH is used to indicate to schedule a first physical downlink shared channel (PDSCH), and the first PDSCH is used to transmit first data;

sending a second PDCCH;

determining, based on the first PDCCH and the second PDCCH, a first resource used to transmit the first data, wherein the first resource is a part or all of a resource of the first PDSCH; and sending the first data on the first resource, wherein when a resource of the second PDCCH overlaps the resource of the first PDSCH, the determining, based on the first PDCCH and the second PDCCH, a first resource used to transmit the first data comprises:

determining, as the first resource, a resource other than the second PDCCH in the first PDSCH scheduled by using the first PDCCH by discarding a part of the resource overlapping the second PDCCH.

8. A communication apparatus, comprising:

a communication unit, configured to, in coordination with a processing unit, receive a first physical downlink control channel (PDCCH), wherein the first PDCCH is used to schedule a first physical downlink shared channel (PDSCH), and the first PDSCH is used to transmit first data; and further configured to receive a second PDCCH; and the processing unit further configured to determine, based on the first PDCCH and the second PDCCH, a first resource used to transmit the first data, wherein the first resource is a part or all of a resource of the first PDSCH, wherein the communication unit is further configured to receive the first data on the first resource, wherein when a resource of the second PDCCH overlaps the resource of the first PDSCH, the determine, based on the first PDCCH and the second PDCCH, a first resource used to transmit the first data comprises:

determine, as the first resource, a resource other than the second PDCCH in the first PDSCH scheduled by using the first PDCCH by discarding a part of the resource overlapping the second PDCCH.

9. The apparatus according to claim 8, wherein the second PDCCH is used to schedule a second PDSCH; and when a resource of the second PDSCH overlaps the resource of the first PDSCH, the processing unit is further configured to determine, as the first resource, a resource other than the second PDSCH in the first PDSCH.

10. The apparatus according to claim 8, wherein the second PDCCH is used to schedule a second PDSCH; and when both a resource of the second PDCCH and a resource of the second PDSCH overlap the resource of the first PDSCH, the processing unit is further configured to: determine, as the first resource, a resource other than the second PDCCH and the second PDSCH in the first PDSCH scheduled by using the first PDCCH.

11. The apparatus according to claim 8, wherein the second PDCCH is used to schedule a second PDSCH; and when neither a resource of the second PDCCH nor a resource of the second PDSCH overlaps the resource of the first PDSCH, the processing unit is further configured to: determine, as the first resource, the first PDSCH scheduled by using the first PDCCH.

12. The apparatus according to claim 8, wherein the processing unit is further configured to: when the first PDCCH and the second PDCCH meet a preset condition, determine, based on the first PDSCH and the second PDCCH, the first resource used to transmit the first data.

13. The apparatus according to claim 8, wherein the processing unit is further configured to: when the first PDCCH and the second PDCCH do not meet a preset condition, determine, based on the first PDCCH, the first resource used to transmit the first data.

14. The apparatus according claim 8, wherein the apparatus is a chip or a terminal device.

15. A communication apparatus, comprising:

a communication unit, configured to, in coordination with a processing unit send a first physical downlink control channel (PDCCH), wherein the first PDCCH is used to indicate to schedule a first physical downlink shared channel (PDSCH), and the first PDSCH is used to transmit first data; and configured to send a second PDCCH; and the processing unit, further configured to determine, based on the first PDCCH and the second PDCCH, a first resource used to transmit the first data, wherein the first resource is a part or all of a resource of the first PDSCH, wherein the communication unit is further configured to send the first data on the first resource, wherein when a resource of the second PDCCH overlaps the resource of the first PDSCH, the determine, based on the first PDCCH and the second PDCCH, a first resource used to transmit the first data comprises:

determine, as the first resource, a resource other than the second PDCCH in the first PDSCH scheduled by using the first PDCCH by discarding a part of the resource overlapping the second PDCCH.

16. The apparatus according claim 15, wherein the apparatus is a chip or a network device.

* * * * *